US012546783B2

(12) United States Patent
Young

(10) Patent No.: US 12,546,783 B2
(45) Date of Patent: Feb. 10, 2026

(54) COMPOSITIONS AND METHODS FOR PROTEIN DETECTION

(71) Applicant: Syngenta Crop Protection AG, Basel (CH)

(72) Inventor: Scott Young, Research Triangle Park, NC (US)

(73) Assignee: Syngenta Crop Protection AG, Basel (CH)

( * ) Notice: Subject to any disclaimer, the term of this patent is extended or adjusted under 35 U.S.C. 154(b) by 1057 days.

(21) Appl. No.: 17/606,594

(22) PCT Filed: Apr. 21, 2020

(86) PCT No.: PCT/US2020/029068
§ 371 (c)(1),
(2) Date: Oct. 26, 2021

(87) PCT Pub. No.: WO2020/223057
PCT Pub. Date: Nov. 5, 2020

(65) Prior Publication Data
US 2022/0291227 A1   Sep. 15, 2022

Related U.S. Application Data

(60) Provisional application No. 62/839,988, filed on Apr. 29, 2019.

(51) Int. Cl.
*C07K 7/06* (2006.01)
*G01N 1/34* (2006.01)
*G01N 33/58* (2006.01)
*G01N 33/68* (2006.01)

(52) U.S. Cl.
CPC ............ *G01N 33/6848* (2013.01); *C07K 7/06* (2013.01); *G01N 1/34* (2013.01); *G01N 33/58* (2013.01); *G01N 2333/90241* (2013.01); *G01N 2458/15* (2013.01)

(58) Field of Classification Search
None
See application file for complete search history.

(56) References Cited

U.S. PATENT DOCUMENTS

| | | | |
|---|---|---|---|
| 6,245,968 B1 | 6/2001 | Boudec et al. | |
| 2005/0153380 A1* | 7/2005 | Everett | G01N 33/6848 435/7.92 |
| 2007/0011783 A1 | 1/2007 | Liu et al. | |
| 2010/0173786 A1 | 7/2010 | Brun et al. | |
| 2012/0080590 A1 | 4/2012 | Basu | |
| 2014/0053295 A1 | 2/2014 | Hawkes et al. | |
| 2014/0294700 A1* | 10/2014 | Marx | A61P 35/00 423/2 |
| 2016/0017351 A1 | 1/2016 | Albert et al. | |
| 2017/0058291 A1 | 3/2017 | Siehl et al. | |

FOREIGN PATENT DOCUMENTS

| | | |
|---|---|---|
| WO | 2010085705 A2 | 7/2010 |
| WO | 2016/193287 | 12/2016 |
| WO | 2017050825 A1 | 3/2017 |

OTHER PUBLICATIONS

Swatkoski et al (Screening of Processed Foods for Transgenic Proteins from Genetically Engineered Plants Using Targeted Mass Spectrometry, Anal. Chem. 2020, 92, 3455-3462 (Year: 2020).*
Hill et al (Development and Validation of a Multiplexed Protein Quantitation Assay for the Determination of Three Recombinant Proteins in Soybean Tissues by Liquid Chromatography with Tandem Mass Spectrometry, J. Agric. Food Chem. 2015, 63, 7450-7461 (Year: 2015).*
Hill et al (Measurement of lipid transfer proteins in genetically engineered maize using liquid chromatography with tandem mass spectrometry (LC-MS/MS), GM Crops & Food, 2017, 8, 229-242 (Year: 2017).*
Siehl et al (Broad 4-Hydroxyphenylpyruvate Dioxygenase Inhibitor Herbicide Tolerance in Soybean with an Optimized Enzyme and Expression Cassette, Plant Physiology, Nov. 2014, vol. 166, pp. 1162-1176 (Year: 2014).*
Hu et al (Multiplexed Protein Quantification in Maize Leaves by Liquid Chromatography Coupled with Tandem Mass Spectrometry: An Alternative Tool to Immunoassays for Target Protein Analysis in Genetically Engineered Crops, J. Agric. Food Chem. 2011, 59, 3551-3558 (Year: 2011).*
Gerber et al (Absolute quantification of proteins and phosphoproteins from cell lysates by tandem MS, PNAS, 2003, vol. 100, No. 12, 6940-6945 (Year: 2003).*
International Search Report cited in International Application No. PCT/US2020/029068, mailed on Aug. 4, 2020.
Alwine J.C., et al., "Method for Detection of Specific RNAs in Agarose Gels by Transfer to diazobenzyloxymethyl-paper and Hybridization with DNA Probes," Proceedings of the National Academy of Sciences, Dec. 1977, vol. 74, No. 12, pp. 5350-5354.
Baldwin M.A., et al., "Protein Identification by Mass Spectrometry: Issues to be Considered," Molecular & Cellular Proteomics, Jan. 2004, vol. 3, No. 1, pp. 1-9.
Chang W.W.P., et al., "Patterns of Protein Synthesis and Tolerance of Anoxia in Root Tips of Maize Seedlings Acclimated to a Low-Oxygen Environment, and Identification of Proteins by Mass Spectrometry," Plant Physiology, Feb. 2000, vol. 122, pp. 295-317.
Domon B., et al., "Mass Spectrometry and Protein Analysis," Science, Apr. 14, 2006, vol. 312 (5771) pp. 212-217.

(Continued)

*Primary Examiner* — Paul S Hyun
(74) *Attorney, Agent, or Firm* — Kelly Williamson

(57) ABSTRACT

The invention relates generally to peptide biomarkers with specific ionization characteristics to directly quantify one or more target HPPD proteins in biological samples, including crop plant samples, by liquid chromatography coupled tandem mass spectrometry multiple reaction monitoring (MRM). The peptide biomarkers in combination with MRM-based methods may be used to quantify a single target protein or multiple target proteins within a crop plant, such as maize, utilizing selected peptide biomarkers either alone or in combination. The present disclosure allows for broad based, reliable quantitation in different biological matrices, including plant matrices. Also provided are different peptide biomarker combinations that can be used to perform the methods of the invention.

12 Claims, No Drawings

Specification includes a Sequence Listing.

(56) References Cited

OTHER PUBLICATIONS

Nain V., et al., "Polymerase Chain Reaction Analysis of Transgenic Plants Contaminated by Agrobacterium," Plant Molecular Biology Reporter, 2005, vol. 23, pp. 59-65.

Patterson S.D., et al., "Mass Spectrometric Approaches for the Identification of Gel-separated Proteins," Electrophoresis, 1995, vol. 16, pp. 1791-1814.

Patterson S.D., et al., "Protein Identification and Characterization by Mass Spectrometry," Current Protocols in Molecular Biology, 1998, Supplement 41, p. 10.22.1-10.22.24.

Rajagopal I., et al., "Protein Sequencing in the Post-Genomic Era," Science, Dec. 21, 2001, vol. 294, 5551, pp. 2571-2573.

Sesikeran B., et al., "Constantly Evolving Safety Assessment Protocols for GM Foods," Asia Pacific Journal of Clinical Nutrition, 2008, vol. 17 (S1), pp. 241-244.

Toplak N., et al., "A High-throughput Method for Quantifying Transgene Expression in Transformed Plants with Real-Time PCR Analysis," 2004, vol. 22, pp. 237-250.

Carr et al., "Overview of Peptide and Protein Analysis by Mass Spectrometry," Current Protocols in Molecular Biology, 1997, Supplement 38; pp. 10.21.1-10.21.27.

Extended European Search Report for European Application No. 20798747.0, mailed Feb. 24, 2023, 7 Pages.

\* cited by examiner

SEQUENCE LISTING

```
<160> NUMBER OF SEQ ID NOS: 2

<210> SEQ ID NO 1
<211> LENGTH: 8
<212> TYPE: PRT
<213> ORGANISM: Glycine max

<400> SEQUENCE: 1

Gly Asn Phe Ser Glu Leu Phe Lys
1               5

<210> SEQ ID NO 2
<211> LENGTH: 8
<212> TYPE: PRT
<213> ORGANISM: Zea mays

<400> SEQUENCE: 2

Gly Asn Phe Ser Gln Leu Phe Lys
1               5
```

COMPOSITIONS AND METHODS FOR PROTEIN DETECTION

RELATED APPLICATION INFORMATION

This application is a 371 of International Application No. PCT/US2020/029068, filed Apr. 21, 2020, which claims priority to U.S. Application No. 62/839,988, filed Apr. 29, 2019, the contents of which are incorporated herein by reference herein.

REFERENCE TO SEQUENCE LISTING SUBMITTED ELECTRONICALLY

The official copy of the sequence listing is submitted electronically via EFS-Web as an ASCII formatted sequence listing with a file named "81875-WO-REG-ORG-P-1_SeqList.txt", created on Oct. 21, 2021, and having a size of 611 bytes and is filed concurrently with the specification. The sequence listing contained in this ASCII formatted document is part of the specification and is herein incorporated by reference in its entirety.

FIELD OF THE INVENTION

The present invention relates generally to the use of mass spectrometry to selectively detect, quantify, and characterize target proteins in complex biological samples.

BACKGROUND

Immunoassay, e.g. enzyme linked immunosorbent assay (ELISA), is the current preferred method in the agricultural industry for detection and quantification of plant endogenous proteins or proteins introduced through genetic modification of plants. The crucial component of an immunoassay is an antibody with specificity for the target protein (antigen). Immunoassays can be highly specific and samples often need only a simple preparation before being analyzed. Moreover, immunoassays can be used qualitatively or quantitatively over a wide range of concentrations. Typically, immunoassays require separate tests for each protein of interest. The antibodies can be polyclonal, raised in animals, or monoclonal, produced by cell cultures. By their nature, a mixture of polyclonal antibodies will have multiple recognition epitopes, which can increase sensitivity, but it is also likely to reduce specificity, as the chances of sequence and structural homology with other proteins increases with the number of different antibody paratopes present. Monoclonal antibodies offer some advantages over polyclonal antibodies because they express uniform affinity and specificity against a single epitope or antigenic determinant and can be produced in vast quantities. However, there are intrinsic properties of all antibodies that limit their use for more demanding applications, such as selective detection and quantitation of single proteins in complex mixtures of similar transgenic or endogenous proteins. In addition, both polyclonal and monoclonal antibodies may require further purification steps to enhance the sensitivity and reduce backgrounds in assays. In addition, ELISA systems are likely unable to detect subtle changes to a target protein that may have a dramatic effect on its physical and biological properties. For example, the antibody might not recognize a specific form of the protein or peptide that has been altered by post-translation modification such as phosphorylation or glycosylation, or conformationally obscured, or modified by partial degradation. Identification of such modifications is vital because changes in the physical and biological properties of these proteins may play an important role in their enzymatic, clinical or other biological activities. Such changes can limit the reliability and utility of ELISA-based quantification methods.

Currently, making a valid identification and/or quantification of a protein in a crop plant depends on the accuracy of the immunoassay. Development of a successful immunoassay depends on certain characteristics of the antigen used for development of the antibody, i.e. size, hydrophobicity and the tertiary structure of the antigen and the quality and accuracy of the antibody. The specificity of antibodies must be checked carefully to elucidate any cross-reactivity with similar substances, which might cause false positive results. A current problem in the industry is that many of the antibodies in commercially available tests kits do not differentiate between similar proteins in various proteins in different crop plants.

Mass spectrometry (MS) provides an alternative platform that overcomes many limitations of ELISA for protein analysis. The field of MS-based analysis has resulted in an important advancement of targeted protein analysis, such as multiple reaction monitoring (MRM) by electrospray liquid chromatography coupled with tandem mass spectrometry (LC-MS/MS). The underlying concept is that proteins may be quantified by measuring their specific constituent peptides (surrogate peptides) following proteolytic digestion. The acquisition of data only for the selected peptides allows measurements with higher precision, sensitivity, and throughput. Protein quantitation by MRM-based measurements of surrogate peptides is the most rapidly growing application of MS in protein analysis. MRM-based protein assays offer two compelling advantages over immuno-based assays, the first being the ability to systematically configure a specific assay for essentially any protein without the use of an antibody. The second is the ability of targeted MS assays to perform multiplexed analysis of many peptides in a single analysis. In addition, MRM is a direct analysis where immune-based assays are indirect. Immuno-based assays rely on a binding assay comprised of a ligating reagent that can be immobilized on a solid phase along with a detection reagent that will bind specifically and use an enzyme to generate a signal that can be properly quantified.

Thus, there is a continuing need to identify surrogate peptides that have all the biochemical properties necessary to function in an MRM-based assay and have an additional property that they are absolutely specific to target proteins that may have large portions of their amino acid sequences that overlap, i.e. one or more of surrogate peptide's transition states are capable of clearly, without interference, differentiating two closely related target proteins across multiple complex matrices. Such selective surrogate peptides and their transition states should be capable of distinguishing target proteins that are similar to each other, or similar to transgenic proteins in a transgenic crop plant.

SUMMARY

The present invention provides labeled surrogate peptides and their respective transition ions that are useful in selectively detecting or quantifying target proteins that are in a complex biological matrix using mass spectrometry. The invention further provides methods and systems for selectively detecting or quantifying a target HPPD protein in the complex biological matrix using the labeled surrogate peptides and transition ions.

In one aspect of the invention, internal standard peptide markers are designed through empirical analysis and in silico digestion analysis; synthesized chemically with a heavy amino acid residue or genetically by expressing a synthetic gene in the presence of stable isotope-labeled amino acid(s) or metabolic intermediates. In certain embodiments, the internal standards may be characterized individually by mass spectrometry (MS) analysis, including tandem mass spectrometry (MS/MS) analysis, more specifically, liquid chromatography-coupled tandem mass spectrometry analysis (LC-MS/MS). After characterization, pre-selected parameters of the peptides can be collected, such as mono isotopic mass of each peptide, its surrogate charge state, the surrogate m/z value, the m/z transition ions, and the ion type of each transition ion. Other considerations include optimizing peptide size, avoiding post-translational modifications, avoiding process induced modifications and avoiding high rates of missed protease cleavages.

In one aspect, the invention provides a labeled surrogate peptide that functions in a mass spectrometry assay to selectively detect or quantitate a p-hydroxyphenylpyruvate dioxygenase (HPPD) protein in a mixture of proteins in one or more biological samples from one or more crop plants, the surrogate peptide comprising a label and an amino acid sequence selected from the group consisting of GNFSELFK (SEQ ID NO:1) and GNFSQLFK (SEQ ID NO: 2). In some embodiments, the labeled surrogate peptide of is labeled by incorporation of a stable isotope labeled (SIL) amino acid. In other embodiments, the SIL amino acid is lysine, isoleucine, valine or arginine. In other embodiments, the plant is barley, rice, soybean, wheat, oat or maize. In still other embodiments, the crop plant is barley, rice, soybean, wheat or rice and the surrogate peptide comprises a label and the amino acid sequence of SEQ ID NO:1. In still other embodiments, the crop plant is maize and the surrogate peptide comprises a label and the amino acid sequence of SEQ ID NO:2.

In one aspect, the invention provides an assay cassette comprising at least two labeled surrogate peptides of claim 1.

In one aspect, the invention provides a method of simultaneously detecting or quantitating one or more target HPPD proteins in a complex biological sample from a crop plant comprising a mixture of the target protein and non-target proteins, the method comprising: (a) obtaining a biological sample from a crop plant; (b) extracting proteins from the biological sample, resulting in an extract comprising a mixture of proteins; (c) reducing the amount of insoluble proteins in the extract of step b, resulting in an extract of concentrated soluble proteins; (d) digesting the soluble proteins in the extract of step c, resulting in an extract comprising peptide fragments, wherein the peptide fragments include at least one surrogate peptide specific for a target protein; € concentrating the peptide fragments in the extract of step d; (f) adding one or more labeled surrogate peptides of the invention, wherein each labeled surrogate peptide has the same amino acid sequence as each surrogate peptide of the target protein, and wherein the number of labeled surrogate peptides that are added is equal to the number of target proteins in the mixture; (g) concentrating the surrogate peptides and the labeled surrogate peptides by reducing the amount of non-surrogate peptides in the mixture; (h) resolving the peptide fragment mixture from step g via liquid chromatography; (i) analyzing the peptide fragment mixture resulting from step h via mass spectrometry, wherein detection of a transition ion fragment of a labeled surrogate peptide is indicative of the presence of a target protein from which the surrogate peptide is derived; and optionally, (j) calculating an amount of a target protein in the biological sample by comparing mass spectrometry signals generated from the transition ion fragment of step i with mass spectrometry signals generated by a transition. In some embodiments, the crop plant is barley, rice, soybean, wheat or rice and the surrogate peptide comprises a label and the amino acid sequence of SEQ ID NO:1. In other embodiments, the crop plant is maize and the surrogate peptide comprises a label and the amino acid sequence of SEQ ID NO:2. In other embodiments, the peptide is labeled by incorporation of a stable isotope labeled (SIL) amino acid. In still other embodiments, the SIL amino acid is lysine, isoleucine, valine or arginine.

Many different combinations of surrogate peptides may be monitored and quantified simultaneously by MRM assay with one or more of the specific surrogate peptides from an HPPD protein of the invention, and therefore provide a means of measuring the total amount of each of those proteins in a given protein preparation obtained from a biological sample by mass spectrometry. These peptides in conjunction with MRM based assays have numerous applications including quantitative peptide/protein analysis for determining expression levels at different growth stages of a crop plant, determining expression levels in different crop plant tissues and organs, including but not limited to leaf tissue, seed and grain, pollen and root tissue, determining potential exposure levels for regulatory risk assessments, determining different levels of proteins in food processing, comparative, and generational studies. In the broadest sense these unique surrogate peptides for the seven proteins may be used in combination with the MRM assay for numerous applications including agricultural applications, bioequivalence testing, biomarker, diagnostic, discovery, food, environmental, therapeutic monitoring in all type of biological and non-biological matrices. In some aspects of the invention, an assay cassette is provided that comprises one or more labelled surrogate peptides of the invention, which allows for the simultaneous and selective detection or quantitation of any one or more target proteins of the invention.

The invention also provides methods for selectively detecting or quantitating target HPPD proteins within a complex biological matrix, such as a biological sample from a crop plant. Such a method includes obtaining a sample from the crop plant, for example a sample from a leaf, seed or grain, pollen or a root; extracting proteins from the plant sample; concentrating the target protein pool by reducing the amount of insoluble proteins in the extract; digesting the soluble proteins in the extract with a selected enzyme, for example trypsin, resulting in an extract comprising peptide fragments, wherein the peptide fragments include at least one surrogate peptide specific for each target protein; adding an assay cassette of SIL peptides that specifically detect target proteins, wherein each labeled surrogate peptide has the same amino acid sequence as each surrogate peptide of the target proteins, and wherein the number of labeled surrogate peptides that are added is equal to the number of target proteins in the mixture; concentrating the surrogate peptides and the labeled surrogate peptides by reducing the amount of non-surrogate peptides in the mixture; resolving the peptide fragment mixture using liquid chromatography; analyzing the peptide fragment mixture using mass spectrometry, wherein detection of a transition ion fragment of a labeled surrogate peptide is indicative of the presence of a target protein from which the surrogate peptide is derived; and optionally, calculating an amount of a target protein in the biological sample by comparing mass spectrometry signals generated from the transition ion fragment with mass spectrometry signals generated by a transition ion of a labeled surrogate peptide. The SIL surrogate peptides derived from the proteins of the invention each have unique transition ions during mass spectrometry-based multiple reaction monitoring (MRM) assay. As such these peptides will generate selective MS ions due to slight changes in collision energy resulting in different degrees of ionization. For example, triple quadrupole MS can be used to produce high m/z ions that are peptide specific. As a result the method of the invention can provide a selective advantage, reducing endogenous background, relative to the use of lower m/z intense ion markers that may be known in the art.

The invention further provides a system for high-throughput detection or quantitation of target proteins. Such system comprises a cassette of pre-designed labelled surrogate peptides that are specific for the target proteins; and one or more mass spectrometers.

Various objects, features, aspects, and advantages of the present invention will become more apparent from the following detailed description of preferred embodiments of the invention, along with the accompanying drawings and sequence listing.

BRIEF DESCRIPTION OF SEQUENCES

SEQ ID NO:1 is an amino acid sequence of stable isotope-labeled surrogate peptide for selective detection and quantitation of a HPPD protein in barley, rice, soybean, wheat and oats.

SEQ ID NO:2 is an amino acid sequence of a stable isotope-labeled surrogate peptide for selective detection and quantitation of a HPPD protein in maize.

DETAILED DESCRIPTION

This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. It is also to be understood that the terminology used herein is for the purpose of describing particular embodiments only, and is not intended to limit the scope of the present invention. General references related to the invention include: Alwine et al. (1977) Proc. Nat. Acad. Sci. 74: 5350-54; Baldwin (2004) Mol. Cell. Proteomics 3(1): 1-9; Can and Annan (1997) Overview of peptide and protein analysis by mass spectrometry. In: Current Protocols in Molecular Biology, edited by Ausubel, et al. New York: Wiley, p. 10.21.1-10.21.27; Chang et al. (2000) Plant Physiol. 122(2): 295-317; Domon and Aebersold (2006) Science 312(5771): 212-17; Nain et al. (2005) Plant Mol. Biol. Rep. 23: 59-65; Patterson (1998) Protein identification and characterization by mass spectrometry. In: Current Protocols in Molecular Biology, edited by Ausubel, et al. New York: Wiley, p. 10.22.1-10.22.24; Paterson and Aebersold (1995) Electrophoresis 16: 1791-1814; Rajagopal and Ahern (2001) Science 294(5551): 2571-73; Sesikeran and Vasanthi (2008) Asia Pac. J. Clin. Nutr. 17 Suppl. 1: 241-44; and Toplak et al. (2004) Plant Mol. Biol. Rep. 22: 237-50.

Definitions

As used herein and in the appended claims, the singular forms "a," "an," and "the" can mean one or more than one. Thus, for example, reference to "a plant" can mean a single plant or multiple plants.

As used herein, "and/or" refers to and encompasses any and all possible combinations of one or more of the associated listed items, as well as the lack of combinations when interpreted in the alternative, "or."

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent, preferably 10 percent up or down (higher or lower). With regard to a temperature the term "about" means±1° C., preferably ±0.5° C. Where the term "about" is used in the context of this invention (e.g., in combinations with temperature or molecular weight values) the exact value (i.e., without "about") is preferred.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the transitional phrase "consisting essentially of" (and grammatical variants) means that the scope of a claim is to be interpreted to encompass the specified materials or steps recited in the claim "and those that do not materially alter the basic and novel characteristic(s)" of the claimed invention. Thus, the term "consisting essentially of" when used in a claim of this invention is not intended to be interpreted to be equivalent to "comprising."

As used herein the term transgenic "event" refers to a recombinant plant produced by transformation and regeneration of a single plant cell with heterologous DNA, for example, an expression cassette that includes a gene of interest. The term "event" refers to the original transformant and/or progeny of the transformant that include the heterologous DNA. The term "event" also refers to progeny produced by a sexual outcross between the transformant and another corn line. Even after repeated backcrossing to a recurrent parent, the inserted DNA and the flanking DNA from the transformed parent is present in the progeny of the cross at the same chromosomal location. Normally, transformation of plant tissue produces multiple events, each of which represent insertion of a DNA construct into a different location in the genome of a plant cell. Based on the expression of the transgene or other desirable characteristics, a particular event is selected. Non-limiting examples of such transgenic events of the invention include "event Bt11," comprising cry1Ab and pat genes and described in U.S. Pat. No. 6,114,608 (also "Bt11 event" or just "Bt11"), "event 5307," comprising eCry3.1Ab and PMI genes and described in U.S. Pat. No. 8,466,346 (also "5307 event" or just "5307"), "event MIR604," comprising mCry3A and PMI genes and described in U.S. Pat. No. 7,361,813 (also "MIR604 event" or just "MIR604"), "event MIR162," comprising Vip3A and PMI genes and described in U.S. Pat. No. 8,232,456 (also "event MIR162" or just "MIR162"), "event GA21," comprising a dmEPSPS gene and described in U.S. Pat. No. 6,566,587 (also "GA21 event" or just "GA21"), "event 3272," comprising alpha-amylase797E and PMI genes and described in U.S. Pat. No. 7,635,799 (also "3272 event" or just "3272"), "event MON810," comprising Cry1Ab and described in U.S. Pat. No. 6,713,259 (also "MON810 event" or just "MON810"), "event MON89034," comprising Cry1A.105 and Cry2Ab genes and described in U.S. Pat. No. 8,062,840 (also "MON89034 event" or just "MON89034"), "event TC1507," comprising Cry1F and PAT genes and described in U.S. Pat. No. 7,288,643 (also "TC1507 event" or just "TC1507"), "event DAS59122," comprising Cry34/Cry35 and PAT genes and described in U.S. Pat. No. 7,323,556 (also "DAS59122 event" or just "DAS59122") and "event DP4114," comprising Cry1F, Cry34/Cry35 and PAT genes and described in U.S. Pat. No. 9,790,561 (also "DP4114 event" or just "DP4114").

The term "isolated" nucleic acid molecule, polynucleotide or toxin is a nucleic acid molecule, polynucleotide or toxic protein that no longer exists in its natural environment. An isolated nucleic acid molecule, polynucleotide or toxin of the invention may exist in a purified form or may exist in a recombinant host such as in a transgenic bacterial cell or a transgenic plant.

As used herein, the general term "mass spectrometry" refers to any suitable mass spectrometry method, device or configuration including, e.g., electrospray ionization (ESI), matrix-assisted laser desorption/ionization (MALDI) MS, MALDI-time of flight (TOF) MS, atmospheric pressure (AP) MALDI MS, vacuum MALDI MS, tandem MS, or any combination thereof. Mass spectrometry devices measure the molecular mass of a molecule (as a function of the molecule's mass-to-charge ratio) by measuring the molecule's flight path through a set of magnetic and electric fields. The mass-to-charge ratio is a physical quantity that is widely used in the electrodynamics of charged particles. The mass-to-charge ratio of a particular peptide can be calculated, a priori, by one skilled in the art. Two particles with different mass-to-charge ratio will not move in the same path in a vacuum when subjected to the same electric and magnetic fields. The present invention includes, inter alia, the use of high performance liquid chromatography (HPLC) followed by tandem MS analysis of the peptides. In "tandem mass spectrometry," a surrogate peptide may be filtered in an MS instrument, and the surrogate peptide subsequently fragmented to yield one or more "transition ions" that are analyzed (detected and/or quantitated) in a second MS procedure.

A detailed overview of mass spectrometry methodologies and devices can be found in the following references which are hereby incorporated by reference: Can and Annan (1997) Overview of peptide and protein analysis by mass spectrometry. In: Current Protocols in Molecular Biology, edited by Ausubel, et al. New York: Wiley, p. 10.21.1-10.21.27; Paterson and Aebersold (1995) Electrophoresis 16: 1791-1814; Patterson (1998) Protein identification and characterization by mass spectrometry. In: Current Protocols in Molecular Biology, edited by Ausubel, et al. New York: Wiley, p. 10.22.1-10.22.24; and Domon and Aebersold (2006) Science 312(5771): 212-17.

A peptide is a short polymer formed from the linking, in a defined order, of alpha-amino acids. Peptides may also be generated by the digestion of polypeptides, for example proteins, with a protease.

A "plant" is any plant at any stage of development, particularly a seed plant.

A "plant cell" is a structural and physiological unit of a plant, comprising a protoplast and a cell wall. The plant cell may be in the form of an isolated single cell or a cultured cell, or as a part of a higher organized unit such as, for example, plant tissue, a plant organ, or a whole plant.

"Plant cell culture" means cultures of plant units such as, for example, protoplasts, cell culture cells, cells in plant tissues, pollen, pollen tubes, ovules, embryo sacs, zygotes and embryos at various stages of development.

"Plant material" refers to leaves, stems, roots, flowers or flower parts, fruits, pollen, egg cells, zygotes, seeds, cuttings, cell or tissue cultures, or any other part or product of a plant.

A "plant organ" is a distinct and visibly structured and differentiated part of a plant such as a root, stem, leaf, flower bud, or embryo.

"Plant tissue" as used herein means a group of plant cells organized into a structural and functional unit. Any tissue of a plant in planta or in culture is included. This term includes, but is not limited to, whole plants, plant organs, plant seeds, tissue culture and any groups of plant cells organized into structural and/or functional units. The use of this term in conjunction with, or in the absence of, any specific type of plant tissue as listed above or otherwise embraced by this definition is not intended to be exclusive of any other type of plant tissue.

As used herein, the term "surrogate peptide" refers to a peptide that is derived from a target protein via proteolytic digestion, e.g. trypsin digestion, that functions in a mass spectrometry assay to produce one or more transition ions that in combination with the surrogate peptide differentially detects and/or quantitates the target protein when the target protein is in the presence of one or more other proteins and/or transgenic proteins in a complex biological matrix, such as a sample from a crop plant, and does not detect and/or quantitate the one or more other proteins or transgenic proteins in the biological matrix. A "surrogate peptide" may also be referred to as a "signature peptide" for the target protein. For example, a HPPD surrogate peptide of the invention produces one or more transition ions that in combination with a HPPD-surrogate peptide differentially detects and/or quantitates a target HPPD protein in a complex biological matrix when the HPPD protein is in the presence of one or more non-HPPD proteins. According to embodiments of the invention, two or more labelled surrogate peptides of the invention may be used simultaneously in a mass spectrometry assay to detect and/or quantitate two or more target proteins in a complex biological matrix.

A "labeled surrogate peptide" is a non-naturally occurring surrogate peptide that is labeled for ease of detecting the surrogate peptide in a mass spectrometry assay. For example, the label can be a stable isotope labeled amino acid (SIL) such a lysine, isoleucine, valine or arginine. Thus, an SIL-labeled surrogate peptide has the same amino acid sequence as a non-labeled surrogate peptide except that one or more of the amino acids of the surrogate peptide are labeled with a heavy isotope. For example, as described herein, the surrogate peptide GNFSELFK (SEQ ID NO:1) is labeled with a heavy lysine (K) and may be designated GNFSELFK [C13N15-K], and so on.

As used herein, the term "stacked" or "stacking" refers to the presence of multiple heterologous polynucleotides or transgenic proteins or transgenic events incorporated in the genome of a plant.

A "target protein" as used herein means a protein, which is intended to be selectively detected and/or quantitated by a labelled surrogate peptide when the target protein is in a complex biological matrix.

Nucleotides are indicated herein by the following standard abbreviations: adenine (A), cytosine (C), thymine (T), and guanine (G). Amino acids are likewise indicated by the following standard abbreviations: alanine (Ala; A), arginine (Arg; R), asparagine (Asn; N), aspartic acid (Asp; D), cysteine (Cys; C), glutamine (Gln; Q), glutamic acid (Glu; E), glycine (Gly; G), histidine (His; H), isoleucine (Ile; 1), leucine (Leu; L), lysine (Lys; K), methionine (Met; M), phenylalanine (Phe; F), proline (Pro; P), serine (Ser; S), threonine (Thr; T), tryptophan (Trp; W), tyrosine (Tyr; Y), and valine (Val; V).

The present invention encompasses compositions, methods and systems useful in carrying out mass spectrometry for differential detection and/or quantitation of one or more target HPPD proteins in complex biological samples derived from crop plants comprising a mixture of target and non-target proteins, for example, biological samples from leaves, stems, roots, pollen and seeds of one or more crop plants, each of which may impact mass spectrometry assay results differently.

The accuracy of target protein quantitation by a mass spectrometry multiple reaction monitoring assay (MRM) is completely dependent on the selection of an appropriate surrogate peptide and on the target protein differentiating capability of the surrogate peptide/transition ion combination. Many different combinations of surrogate peptides of the invention may be monitored and quantified simultaneously by an MRM assay with one or more of the specific peptides from HPPD proteins, and therefore provide a means of identifying and quantifying each of the target HPPD proteins within a given biological sample by mass spectrometry. The available surrogate peptides that make up the cassette may be analyzed alone or in any combination in a single MRM assay or analyzed in multiple MRM assays.

The surrogate peptides of the invention in conjunction with MRM based assays have numerous applications including quantitative peptide/protein analysis for determining expression levels at different growth stages, determining potential exposure levels for environmental risk assessments, determining different levels of target proteins in food processing, determining expression levels in comparative studies, and comparing expression levels in generational studies. In the broadest sense these unique surrogate peptides for the target proteins may be used in combination with the MRM assay for monitoring or quantifying herbicidal tolerance traits that may be in either crop plants or transgenic events, or breeding stacks of multiple transgenic events within a specific tissue (i.e. leaf, root, kernel, pollen).

The MRM based assays may either quantify or measure relative or absolute levels of specific surrogate peptides from HPPD proteins. Relative quantitative levels of these proteins can be determined by the MRM assay by comparing signature peak areas to one another. The relative levels of individual HPPD surrogate peptides can be quantified from different samples or tissue types. In general, relative quantitative levels are determined by comparing peptide abundances in MRM measurements with a stable isotope-labeled (SIL) synthetic peptide analogue as an internal standard for each target surrogate peptide. Contrary to what is typically taught in the art, SIL peptides are labeled by incorporation of [$^{13}C_6^{15}N_2$] lysine or [$^{13}C_6^{15}N_4$] arginine, but may also include other amino acids such as isoleucine and valine. The SIL standard needs to be of high purity and should be quantitatively standardized by amino acid analysis. Contrary to what is typically taught in the art, the SIL's of the present invention are spiked into samples immediately after protein digestion and thus serve to correct for subsequent analytical steps. The SIL's co-elute with the unlabeled surrogate peptides in liquid chromatography separations and display identical MS/MS fragmentation patterns but differ only in mass due to the isotope labeling. This resulting mass shift in both labelled surrogate peptides and product ions allows the mass spectrometer to differentiate the unlabeled and labeled peptides. Because complex peptide digests often contain multiple sets of co-eluting transitions that may be mistaken for the target peptide, co-elution of the isotopically labeled standard identifies the correct signal and provides the best protection against false positive quantitation. Since a known concentration of a spiked SIL standard is spiked into each sample the relative quantitative amount of each corresponding surrogate peptide from the different target proteins may be determined for HPPD proteins. Since relative quantitation of an individual peptide, or peptides, may be conducted relative to the amount of another peptide, or peptides, within or between samples, it is possible to determine the relative amounts of the peptides present by determining if the peak areas are relative to one another within the biological sample. Relative quantitative data derived from individual signature peak areas between different samples are generally normalized to the amount of protein analyzed per sample. Relative quantitation can be performed across many peptides from multiple proteins simultaneously in a single sample and/or across many samples to gain further insight into relative protein amounts, one peptide/protein with respect to other peptides/proteins.

Absolute quantitative levels may be determined for HPPD by MRM based assays by comparing the signature peak area of an individual surrogate peptide from the corresponding proteins in one biological sample to a known amount of one or more internal standards in the sample. This may be achieved by spiking known concentrations of these proteins into negative control matrices which do not contain the target proteins. The multiple-reaction monitoring (MRM) assay comprises of weighing the non-target sample with exact spiked concentrations of a target protein; extracting and homogenizing samples in a lysis buffer; centrifuging samples to separate soluble and insoluble proteins to enrich and reduce the complexity of the extraction; digesting soluble protein samples with trypsin (the tissue or biological sample may be treated with one or more proteases, including but not limited to trypsin, chymotrypsin, pepsin, endoproteinase Asp-N and Lys-C for a time to adequately digest the sample), centrifuging samples, adding a fixed concentration SIL peptide (in absolute quantitation the SIL is used as an indicator); desalting by solid-phase extraction utilizing cation exchange to minimize matrix effects or interferences and reduce ion suppression; and analyzing the sample by liquid chromatography coupled to tandem mass spectrometry. Typically an ion trap mass spectrometer, or another form of a mass spectrometer that is capable of performing global profiling, for identification of as many peptides as possible from a single complex protein/peptide lysate is typically performed for analysis. Although MRM-based assays can be developed and performed on any type of mass spectrometer, the most advantageous instrument platform for MRM assays is often considered to be a triple quadrupole instrument platform. The surrogate peptides of interest and SIL that are unique to the seven proteins are measured by LC-MS/MS. The peak area ratio (peak area of surrogate peptide/peak area of corresponding SIL peptide) is determined for each peptide of interest. The concentration of the seven proteins of interest is back-calculated from the calibration curve using the peak area ratio. Absolute quantitation can be performed across many peptides, which permits a quantitative determination of multiple proteins simultaneously in a single sample and/or across multiple samples to gain insight into absolute protein amounts in individual biological samples or large samples sets.

In some embodiments, the invention encompasses a labeled surrogate peptide that functions in a mass spectrometry assay to selectively detect or quantitate a p-hydroxyphenylpyruvate dioxygenase (HPPD) protein in a mixture of proteins in one or more biological samples from one or more crop plants, the surrogate peptide comprising a label and an amino acid sequence selected from the group consisting of GNFSELFK (SEQ ID NO:1) and GNFSQLFK (SEQ ID NO:2). In some aspects, the labeled surrogate peptide is labeled by incorporation of a stable isotope labeled (SIL) amino acid. In other aspects, the SIL amino acid is lysine, isoleucine, valine or arginine. In other aspects, the crop plant is barley, rice, soybean, wheat, oat or maize. In still other aspects, the crop plant is barley, rice, soybean, wheat or rice and the surrogate peptide comprises a label and the amino acid sequence of SEQ ID NO: 1. In still other aspects, the crop plant is maize and the surrogate peptide comprises a label and the amino acid sequence of SEQ ID NO:2.

In some embodiments, the invention encompasses an assay cassette comprising at least two labeled surrogate peptides comprising an amino acid sequence selected from the group consisting of GNFSELFK (SEQ ID NO:1) and GNFSQLFK (SEQ ID NO:2).

In some embodiments, the invention encompasses a method of simultaneously detecting or quantitating one or more target HPPD proteins in a complex biological sample from a crop plant comprising a mixture of the target protein and non-target proteins, the method comprising: (a) obtaining a biological sample from a crop plant; (b) extracting proteins from the biological sample, resulting in an extract comprising a mixture of proteins; (c) reducing the amount of insoluble proteins in the extract of step b, resulting in an extract of concentrated soluble proteins; (d) digesting the soluble proteins in the extract of step c, resulting in an extract comprising peptide fragments, wherein the peptide fragments include at least one surrogate peptide specific for a target protein; (e) concentrating the peptide fragments in the extract of step d; (f) adding one or more labeled surrogate peptides of the invention, wherein each labeled surrogate peptide has the same amino acid sequence as each surrogate peptide of the target protein, and wherein the number of labeled surrogate peptides that are added is equal to the number of target proteins in the mixture; (g) concentrating the surrogate peptides and the labeled surrogate peptides by reducing the amount of non-surrogate peptides in the mixture; (h) resolving the peptide fragment mixture from step g via liquid chromatography; (i) analyzing the peptide fragment mixture resulting from step h via mass spectrometry, wherein detection of a transition ion fragment of a labeled surrogate peptide is indicative of the presence of a target protein from which the surrogate peptide is derived; and optionally, (j) calculating an amount of a target protein in the biological sample by comparing mass spectrometry signals generated from the transition ion fragment of step i with mass spectrometry signals generated by a transition. In some aspects, the crop plant is barley, rice, soybean, wheat or rice and the surrogate peptide comprises a label and the amino acid sequence of SEQ ID NO:1. In other aspects, the crop plant is maize and the surrogate peptide comprises a label and the amino acid sequence of SEQ ID NO:2. In other aspects, the peptide is labeled by incorporation of a stable isotope labeled (SIL) amino acid. In still other aspects, the SIL amino acid is lysine, isoleucine, valine or arginine.

There are many references in the art that have suggested many different methods of predicting which surrogate peptides are the best for any given target protein and many references have suggested shortcuts to quantifying target proteins using mass spectrometry, e.g. Mead et al. 2009. Mol. Cell. Proteomics 8: 696-705 and U.S. Pat. No. 8,227,252. However, reliance on such prediction methods and shortcuts can lead to confounding results, because unpredictable factors can interfere with the mass spectrometry based assay thus causing a loss of sensitivity and inaccurate quantification. At least one primary factor lies in the biological matrix itself. For example, it is very unpredictable and difficult to identify a single transition ion from a surrogate peptide that will work equally well with biological samples from leaves, roots, pollen and seeds from crop plants. Differences in chemical composition, pH, or ionic strength of the matrix can influence proteolysis, peptide stability, aggregation, or ionization in an MS instrument. Therefore, identifying and empirically testing surrogate peptides and specific surrogate peptide/transition ion combination across all relevant matrices, particularly those for crop plants is imperative to overcome the unpredictable nature of such assays. The present invention employs a two-step approach in developing mass spectrometry assays for specifically detecting and/or quantitating target proteins, including 1) testing and selecting surrogate peptides from a pool of peptides derived from a proteolytically cleaved target protein and testing combinations of SIL surrogate peptides and transition ion peptides and selecting the combination that specifically detects and quantitates the target protein across all biological matrices, for example biological samples from leaves, roots, pollen or seeds of crop plants; and 2) empirically determining appropriate methods of sample preparation and mass spectrometer conditions that work for all surrogate peptides and surrogate peptide/transition ion combinations in all biological matrices, including leaves, roots, pollen and seeds of crop plants, particularly corn plants.

Therefore, in some embodiments, the present invention encompasses a method of simultaneously detecting and/or quantitating one or more target proteins in a complex biological sample from a transgenic plant comprising a mixture of the target transgenic proteins and non-transgenic proteins, where the method comprises the following steps: a) obtaining a biological sample from a transgenic plant; b) extracting proteins from the biological sample, resulting in an extract comprising a mixture of proteins; c) reducing the amount of non-transgenic insoluble proteins in the extract of step b, resulting in an extract of concentrated soluble proteins; d) digesting the soluble proteins in the extract of step c, resulting in an extract comprising peptide fragments, wherein the peptide fragments include at least one non-labeled surrogate peptide specific for each target protein; e) concentrating the peptide fragments in the extract of step d; f) adding one or more labeled surrogate peptides of the invention, wherein each labeled surrogate peptide has the same amino acid sequence as each non-labeled surrogate peptide derived from the target proteins, and wherein the number of labeled surrogate peptides that are added is equal to the number of target proteins in the mixture; g) concentrating the non-labeled surrogate peptides and the labeled surrogate peptides by reducing the amount of non-surrogate peptides in the mixture; h) resolving the peptide fragment mixture from step g via liquid chromatography; i) analyzing the peptide fragment mixture resulting from step h via mass spectrometry, wherein detection of a transition ion fragment of a non-labeled surrogate peptide is indicative of the presence of a target protein from which the surrogate peptide is derived; and optionally, j) calculating an amount of a target protein in the biological sample by comparing mass spectrometry signals generated from the transition ion fragment of step i with mass spectrometry signals generated by a transition ion of a labeled surrogate peptide.

The following specific examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

EXAMPLES

While the invention has been described in connection with specific embodiments thereof, it will be understood that the inventive device is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

All publications and patent applications mentioned in this specification are indicative of the level of skill of those skilled in the art that this invention pertains. All publications and patent applications are herein incorporated by reference to the same extent as if each individual publication or patent application was specifically and individually indicated to be incorporated by reference.

Example 1. Validation for the Quantitation of Endogenous p-Hydroxyphenylpyruvate Dioxygenase in Commodity Crop Articles of Commerce Using a Mass Spectrometry Assay The purpose of this study was to validate the mass spectrometry (MS)-based method for the quantification of p-hydroxyphenylpyruvate dioxygenase (HPPD) protein in various commodity crops (barley, maize, rice, soybean, and wheat seed, and, barley, maize, oat, soybean and wheat forage) using liquid chromatography coupled to tandem mass spectrometry (LC-MS/MS). Surrogate peptides that are unique to the HPPD protein were used to determine the relative concentration. Prior to implementing a quantitative method in studies, the method was validated for the intended use in accordance to Good Laboratory Practice Standards (GLPS). Commodity crop samples were used to evaluate method performance parameters including specificity, linearity, limits of quantitation, carryover, precision and accuracy, extraction efficiency and stability.

Evaluation of specificity showed no significant interference at the retention time of the non-labeled peptides (<30.0% difference in the average ratio of the two transitions between the blank and buffer) and stable isotopic-labeled (SIL) peptides (≤5.0% of SIL signal of QC0 (endogenous)) in any of the commodity crop samples that were tested. All specificity parameters met acceptance criteria.

Lower limits of quantitation (LLOQ) for each signature peptide used as surrogates for the target HPPD protein were determined. The limit of quantitation was 0.209 µg/g dry weight (DW) for barley seed, 0.122 µg/g DW for maize seed, 0.083 µg/g DW for rice seed, 0.686 µg/g DW for soybean seed, 0.301 µg/g DW for wheat seed, 0.524 µg/g DW for barley forage, 0.326 µg/g DW for maize forage, 0.660 µg/g DW for oat forage, 1.001 µg/g DW for soybean forage and 0.640 µg/g DW for wheat forage.

The validated quantitative range (LLOQ and upper limit of quantitation (ULOQ)) of HPPD for each commodity crop is summarized in Table 1

TABLE 1

| Quantitative Ranges | | | |
|---|---|---|---|
| Plant Species/ Matrix | Surrogate Peptide | Quantitative Range (fmol/mg DW) | Quantitative Range (µg/gDW) |
| Barley Seed | GNFSELFK | 4.520 to 271.200 | 0.209 to 12.567 |
| Rice Seed | | 1.776 to 106.543 | 0.083 to 5.001 |
| Soybean Seed | | 14.054 to 843.231 | 0.686 to 41.161 |
| Wheat Seed | | 6.457 to 387.429 | 0.301 to 18.060 |
| Barley Forage | | 11.300 to 678.000 | 0.524 to 31.418 |
| Soybean Forage | | 20.501 to 1230.086 | 1.001 to 60.045 |
| Wheat Forage | | 13.721 to 823.286 | 0.640 to 38.378 |
| Oat Forage | | 14.044 to 842.657 | 0.660 to 39.602 |
| Maize Seed | GNFSQLFK | 2.585 to 155.077 | 0.122 to 7.289 |
| Maize Forage | | 6.941 to 416.486 | 0.326 to 19.576 |

Intra- and inter-assay CVs were ≤25.0% for the QC0 samples and ≤20.0% for the quality control (QC) samples at three concentrations (low, mid and high) showing good method precision. Similarly, the intra- and inter-assay % bias was within ±20.0% for the low, mid and high QC samples showing good method accuracy. Therefore, all method precision and accuracy parameters met acceptance criteria. The intra- and inter-assay precision and accuracy of the method are summarized in

TABLE 2

Intra- and Inter-Assay Precision and Accuracy Range for HPPD in Commodity Crops

| Plant Species/ Matrix | Intra-Assay Precision (% CV) | Intra-Assay Accuracy (% bias) | Inter-Assay Precision (% CV) | Inter-Assay Accuracy (% bias) |
|---|---|---|---|---|
| Barley Seed | 0.8 to 5.5 | −8.4 to 1.5 | 2.3 to 5.0 | −6.2 to −3.2 |
| Maize Seed | 0.5 to 6.7 | −19.5 to −0.3 | 4.9 to 8.6 | −9.9 to −3.8 |
| Rice Seed | 0.2 to 2.8 | −6.3 to −0.4 | 1.3 to 2.4 | −5.7 to −1.7 |
| Soybean Seed | 0.5 to 4.8 | −8.9 to −2.9 | 2.5 to 3.4 | −6.4 to −5.1 |
| Wheat Seed | 0.8 to 3.7 | −10.1 to −1.5 | 1.5 to 4.4 | −7.6 to −6.5 |
| Barley Forage | 0.5 to 5.8 | −18.9 to −4.0 | 2.8 to 5.4 | −16.6 to −5.3 |
| Maize Forage | 0.9 to 4.9 | −15.6 to −2.1 | 5.3 to 7.0 | −10.5 to −5.2 |
| Oat Forage | 0.4 to 8.6 | −10.7 to 0.9 | 1.5 to 5.5 | −7.6 to −2.8 |
| Soybean Forage | 0.6 to 5.1 | −11.6 to −2.3 | 1.6 to 4.9 | −6.5 to −5.6 |
| Wheat Forage | 0.9 to 6.2 | −10.1 to −0.7 | 2.8 to 6.0 | −8.2 to −4.6 |

A linear equation with a data weighting of 1/x was used to represent the concentration/detector response relationship. Therefore, all of the established data fell within the acceptance criteria and were found to be suitable for the linearity assessment. The efficiency of the protein extraction method was 59.9% for barley seed, 69.8% for maize seed, 73.9% for rice seed, 64.9% for soybean seed, 54.3% for wheat seed, 69.8% for barley forage, 76.3% for maize forage, 78.4% for oat forage, 65.4% for soybean forage and 77.2% for wheat forage. The CV of the first round of extraction was below 20.0% for all commodity crops except for wheat seed which was 27.5% CV. However the Precision and Accuracy results (QC0) of wheat seed coming from a single extraction demonstrate that a precision ≤20.0% was achieved.

The processed stability (dry extract) was evaluated for 6 days at −20° C. The stability assessment met acceptance criteria. The CV was ≤25.0% and the % difference of peak area ratios between stability and Day 0 QCs were within ±25.0% for all commodity crops.

All performance parameters evaluated met the defined acceptance criteria except for the % of the final extraction of barley and wheat seed which was 8.2 and 6.2% respectively as well as the precision of the first round of extraction for wheat seed which was at 27.5% CV. Since the concentration of HPPD in samples analysis will be determined from a single extraction (first round) and adjusted for % extraction efficiency and a precision of ≤20.0% was achieved for wheat seed in the precision and accuracy runs there is no impact on the outcome of the study. Based on the results of this study, the mass spectrometry-based method has been confirmed to be suitable for quantification of HPPD protein in commodity crops in accordance with GLPS.

The purpose of this study was to validate the mass spectrometry (MS)-based method for the quantification of p-hydroxyphenylpyruvate dioxygenase (HPPD) protein in various commodity crops (barley, maize, rice, soybean, and wheat seed, and, barley, maize, oat, soybean and wheat forage) using liquid chromatography coupled to tandem mass spectrometry (LC-MS/MS) analysis. Surrogate peptides that are unique to the HPPD protein were used to determine the relative concentration in the different plant species/matrices (Table 3). Prior to implementing a quantitative method in studies, the method was validated for the intended use in accordance to Good Laboratory Practice Standards (GLPS). Commodity crop samples were used to evaluate method performance parameters including specificity, linearity, limits of quantitation, carryover, precision and accuracy, extraction efficiency and stability.

TABLE 3

HPPD Surrogate Peptides

| Plant Species | Matrix | Surrogate Peptide |
|---|---|---|
| rice, soybean, wheat, barley | seed | GNFSELFK (SEQ ID NO: 1) |
| oat, soybean, wheat, barley | forage | |
| maize | seed | GNFSQLFK (SEQ ID NO: 2) |
| maize | forage | |

The commodity crops material for this study are matrices from various plant species which were used to prepare linearity samples and quality control (QC) samples. Table 4 identifies the source of the matrix materials. These samples were provided by the Sponsor and were stored at a nominal temperature of −80° C.±10° C. until use.

TABLE 4

Commodity Crops Material

| Samples | Description | Material ID |
|---|---|---|
| Commodity Crops | Non-transgenic barley seed | MWF00450113-C |
| | Non-transgenic maize seed | MWF00450097-C |
| | Non-transgenic rice seed | MWF00450103 |
| | Non-transgenic soybean seed | MWF00450091-C |
| | Non-transgenic wheat seed | MWF00450094-C |
| | Non-transgenic barley forage | UR123450002-C |
| | Non-transgenic maize forage | UR123450013-C |
| | Non-transgenic oat forage | UR123450021-C |
| | Non-transgenic soybean forage | UR123450041-C2 |
| | Non-transgenic wheat forage | UR123450053-C |

Standards and QC Samples

For the linearity assessment reverse curves were generated. A set of eight non-zero standards (STDs) were prepared using commodity crop extracts fortified with SIL peptides at different concentrations including both the LLOQ (STD 1) and ULOQ (STD 8) STDs. QC samples were prepared using the commodity crop extracts fortified with non-labeled peptides at three different concentrations (low, mid and high). Table 5 and Table 6 present the nominal concentrations.

TABLE 5

Concentrations of Standards in Commodity Crops (Nominal)

Concentration (fmol/mg DW$^a$)

| Plant Species/ Matrix | STD 1 (LLOQ) | STD 2 | STD 3 | STD 4 | STD 5 | STD 6 | STD 7 | STD 8 (ULOQ) |
|---|---|---|---|---|---|---|---|---|
| Barley Seed | 4.520 | 9.040 | 22.600 | 45.200 | 90.400 | 180.800 | 226.000 | 271.200 |
| Maize Seed | 2.585 | 5.169 | 12.923 | 25.846 | 51.692 | 103.385 | 129.231 | 155.077 |
| Rice Seed | 1.776 | 3.551 | 8.879 | 17.757 | 35.514 | 71.029 | 88.786 | 106.543 |
| Soybean Seed | 14.054 | 28.108 | 70.269 | 140.538 | 281.077 | 562.154 | 702.692 | 843.231 |
| Wheat Seed | 6.457 | 12.914 | 32.286 | 64.571 | 129.143 | 258.286 | 322.857 | 387.429 |
| Barley Forage | 11.300 | 22.600 | 56.500 | 113.000 | 226.000 | 452.000 | 565.000 | 678.000 |
| Maize Forage | 6.941 | 13.883 | 34.707 | 69.414 | 138.829 | 277.657 | 347.071 | 416.486 |
| Oat Forage | 14.044 | 28.089 | 70.221 | 140.443 | 280.886 | 561.771 | 702.214 | 842.657 |
| Soybean Forage | 20.501 | 41.003 | 102.507 | 205.014 | 410.029 | 820.057 | 1025.071 | 1230.086 |
| Wheat Forage | 13.721 | 27.443 | 68.607 | 137.214 | 274.429 | 548.857 | 686.071 | 823.286 |

$^a$DW—dry weight

TABLE 6

Concentrations of QC Samples in Commodity Crops (Nominal$^a$)

Concentration (fmol/mg DW)

| Plant Species/ Matrix | QC 1 (Low) | QC 2 (Mid) | QC 3 (High) |
|---|---|---|---|
| Barley Seed | 13.559 | 67.794 | 180.785 |
| Maize Seed | 7.754 | 38.771 | 103.389 |
| Rice Seed | 5.327 | 26.634 | 71.023 |
| Soybean Seed | 42.158 | 210.790 | 562.108 |
| Wheat Seed | 19.370 | 96.849 | 258.265 |
| Barley Forage | 33.897 | 169.486 | 451.963 |
| Maize Forage | 20.825 | 104.126 | 277.668 |
| Oat Forage | 42.129 | 210.647 | 561.725 |
| Soybean Forage | 61.499 | 307.496 | 819.990 |
| Wheat Forage | 41.161 | 205.805 | 548.812 |

$^a$Nominal = Nominal concentrations prior to adjustment with QC0 (endogenous level of non-labeled peptide)

Synthetic Peptides

The purified and quantified SIL and non-labeled synthetic peptides used in this study are listed in Table 7. The synthetic peptides were supplied by JPT Peptide Technologies GmbH and were stored at a nominal temperature of −20° C. until use.

Analytical Method

The following experimental and data evaluation steps were involved in the validation process for the LC-MS/MS-based method to determine the quantity of HPPD protein in commodity crops. In brief, the LC-MS/MS method for identifying and quantifying surrogate peptides of HPPD in a complex biological matrix comprises: (i) weighing lyophilized commodity crops; (ii) homogenizing/extracting proteins from plant species/matrix samples in a lysis buffer; (iii) centrifugation of samples to separate soluble and insoluble proteins to enrich for protein of interest and reduce the sample complexity; (iv) digestion of soluble protein samples with trypsin; (v) centrifugation of samples; (vi) adding SIL peptides (fixed or variable depending on the assessment); (vii) desalting by solid-phase extraction utilizing cation exchange to minimize matrix effects or interferences and reduce ion suppression; and (viii) analysis of the sample by LC-MS/MS. The surrogate peptides of interest and corresponding SIL peptides that are unique to the HPPD protein for each commodity crop was measured by LC-MS/MS. Data were analyzed using MultiQuant™ software, version 3.0.2, where the chromatographic peak area of each surrogate peptide (non-labeled) and each corresponding SIL peptide was integrated for each sample.

TABLE 7

List of Synthetic Peptides

| Type | Name | Molecular Weight (g/mol) | Batch No. | Purity (%) |
|---|---|---|---|---|
| Stable isotopic-labeled | GNFSELF (SEQ ID NO: 1) [C13N15-HeavyK] | 948.99 | 151018BB11 | 96.8 |
| | GNFSQLF (SEQ ID NO: 2) [C13N15-HeavyK] | 948.01 | 030918SV2-38 | 97.4 |
| Non-labeled | GNFSELFK (SEQ ID NO: 1) | 941.05 | 151018BB10 | 97.4 |
| | GNFSQLFK (SEQ ID NO: 2) | 940.07 | 030918SV2-41 | 98.1 |

For the reverse curve, the peak area of SIL peptide was determined for each surrogate peptide. Then, for each surrogate peptide, the peak area SIL peptide for each standard sample was plotted on the y-axis as a function of protein concentration (x-axis) to create the reverse curve.

For the QC samples, the peak area ratio (peak area of non-labeled peptide/peak area of corresponding SIL peptide) was determined. The non-labeled peptide concentration of the QC samples was calculated as follows:

$$\text{Concentration} (f\text{mol}/\text{mg }DW) = \frac{\text{Peak Area Non-labeled peptide}}{\text{Peak Area }SIL\text{ peptide}} \times \text{Concentration }SIL\ (f\text{mol}/\text{mg }DW)$$

Sample Processing

Between 10 and 18 mg of each commodity crops was weighed and added to tubes containing Matrix A lysing beads (MP Biomedicals). The lysis buffer (0.1% RapiGest™ (Waters) in phosphate-buffered saline (PBS)) was then added to each sample tube and homogenized using Fast-Prep®-24 Homogenizer (MP Biomedicals). Samples were then centrifuged at 4° C. to remove insoluble material. The supernatants were transferred; pooled and diluted accordingly in 0.1% RapiGest in PBS as described in Table 8. These diluted commodity crops were fortified either with SIL peptides resulting in standards or with non-labeled peptides resulting in QC samples at various concentrations.

TABLE 8

Matrix Dilution Factor

| Plant Species/Matrix | Dilution Factor |
| --- | --- |
| Barley Seed | 2.8 |
| Maize Seed | 1.6 |
| Rice Seed | 1.1 |
| Soybean Seed | 8.7 |
| Wheat Seed | 4.0 |
| Barley Forage | 7.0 |
| Maize Forage | 4.3 |
| Oat Forage | 8.7 |
| Soybean Forage | 12.7 |
| Wheat Forage | 8.5 |

For each standard and QC sample that was processed an equal volume of 2,2,2-trifluoroethanol (TFE) was added to denature the proteins, followed by a dilution of TFE to 10% with 100 mM ammonium bicarbonate and digestion using 0.1 µg/µL trypsin with incubation at 37° C. for 14 to 18 hours. After digestion, samples were acidified with a final formic acid (FA) concentration of 5% and SIL peptides were added to each sample at variable or fixed concentrations depending on the validation assessment except for blanks and carry-over blanks. Samples were then desalted by solid-phase extraction using mixed-mode cation exchange (MCX) µElution plates. The eluents were collected and transferred to two MS plates which were evaporated to dryness and stored at −20° C. (nominal) until MS analysis.

The processed samples were resolubilized with 11 µL of 92.5/7.5 water/acetonitrile (ACN)+0.2% FA, followed by sonication, vortexing and centrifugation. Eight microliters of material was injected per sample onto a NanoAcquity ultra-performance liquid chromatography (UPLC)® (Waters) coupled to a QTRAP 6500 mass spectrometer (AB Sciex). Peptide separation was achieved using a HALO peptide ES-C18 50 mm×0.5 mm, 2.7 µm column (Canadian Life Science). The LC gradient used is shown in Table 9 below. The flow rate was 28.000 µL/min. Analytes were measured in positive ion mode using a Turbo V MS source. Data acquisition was performed using Analyst® version 1.6 (AB Sciex).

TABLE 9

LC Gradient of the LC-MS/MS Assay

| Time (min) | (97/3) Water/ DMSO$^a$ + 0.2% FA | (97/3) ACN/ DMSO$^a$ + 0.2% FA |
| --- | --- | --- |
| Initial | 92.5 | 7.5 |
| 0.10 | 92.5 | 7.5 |
| 7.10 | 83.0 | 17.0 |
| 7.30 | 25.0 | 75.0 |
| 7.50 | 25.0 | 75.0 |
| 7.60 | 92.5 | 7.5 |
| 8.00 | 25.0 | 75.0 |
| 8.60 | 25.0 | 75.0 |
| 8.80 | 92.5 | 7.5 |

$^a$DMSO—dimethyl sulfoxide

The surrogate peptides and corresponding SIL peptides are unique to the HPPD protein. The chromatographic peak area of each surrogate peptide (non-labeled) and each corresponding SIL peptide was integrated for each sample using MultiQuant version 3.0.2 (AB Sciex).

For the reverse curve, the peak area of SIL peptide was determined for each surrogate peptide. The peak area SIL peptide for each standard sample was plotted on the y-axis as a function of protein concentration (x-axis) to create the reverse curve.

For the QC samples, the peak area ratio (peak area of non-labeled peptide/peak area of corresponding SIL peptide) was determined. The non-labeled peptide concentration of the QC samples was calculated as described above.

Mean, standard deviation (SD), and coefficient of variation (CV) calculations were performed using Microsoft Office Excel® software. Unrounded values were used in calculations of the means, SDs, and CVs, and were then rounded appropriately in summary tables.

Specificity

Specificity is determined by the ability of a method to measure and differentiate the surrogate peptides in the presence of various plant matrix components in a sample. The specificity is measured by determining the presence or absence of each unique surrogate peptide to the HPPD protein by LC-MS/MS.

The assay specificity was assessed for the non-labeled peptides using the quantifier and qualifier transitions and for the SIL peptides using only the quantifier transition in all commodity crop extracts as described below.

Non-Labeled Peptides

The following analysis was performed:

The assay specificity was evaluated by comparing the average ratio of the two transitions monitored (quantifier/qualifier) in digested bovine serum albumin (BSA) buffer (n=3) fortified with non-labeled peptide versus blank (n=3). Blank is considered matrix with detectable amounts of endogenous HPPD protein processed without the addition of SIL or non-labeled peptides.

The % difference was calculated using the following formula:

$$\frac{\text{Average Ratio Blank} - \text{Average Ratio Buffer}}{\text{Average Ratio Buffer}} \times 100$$

The following acceptance criteria were used to confirm suitability of specificity assessment for the non-labeled peptide: The % difference between the blank and buffer must be within 30.0%.

SIL Peptides

The following analysis was performed:
The assay specificity was evaluated by determining the peak area of the SIL peptide (quantifier transition) in QC0 (endogenous, n=3) versus blank (n=3). Blank is considered matrix with detectable amounts of endogenous HPPD protein processed without addition of SIL or non-labeled peptides.

The % of QC0 (endogenous) was calculated using the following formula:

$$\frac{\text{Average Peak Area Blank}}{\text{Average Peak Area Buffer}} \times 100$$

The following acceptance criteria were used to confirm suitability of specificity assessment for the SIL peptide: The average SIL peptide peak area in the blank samples must be ≤5.0% of the average peak area of the SIL peptide in the QC0 (endogenous) samples.

Linearity

Linearity is the ability of a method to elicit results that are defined mathematically by the amount of analyte in the sample and the response. The linearity was evaluated based on the accuracy of the method. For HPPD in each plant species/matrix, the simplest regression model that defined the reverse curve was used, i.e. a linear curve fit. The model was applied based on quality of fit using the coefficient of correlation (R value).

A data weighting of 1/x was applied for all peptides. The same regression model and the same data weighting were applied for all assay runs of each plant species/matrix.

The following run acceptance criteria were used to confirm suitability of the linearity assessment: (1) At least 75.0% non-zero standards must be valid and must not deviate by more than 20.0% of nominal concentration, except at LLOQ where the deviation must not be more than 25.0%; (2) Interpolated curve must have R≥0.9900.

Limits of Quantitation

The LLOQ and ULOQ are the minimum and maximum concentration at which the response of a surrogate peptide can be determined within acceptable accuracy limits. The LLOQ and ULOQ were determined for a surrogate peptide in each plant species/matrix using the reverse curves as described.

The following acceptance criteria were used to confirm suitability of the LLOQ and ULOQ assessments: The LLOQ and ULOQ standards must meet the accuracy criteria defined above.

The quantitative range for HPPD is the interval between the upper and lower concentration for which it has been demonstrated that the analytical procedure had a suitable level of accuracy and linearity (refer to Table 5 for concentration of standards). The quantitative range was determined for HPPD in each plant species/matrix using the data obtained from the linearity evaluation of this method. Determining accuracy effectively validated the high and low concentrations tested as the quantitative range for the procedure.

Carryover is when an analyte is present in the subsequent injection. In this study, carryover is determined during the linearity assessment by evaluating two blank samples injected after each ULOQ standard. They must be free of interference. The following run acceptance criteria were applied to assess carry-over to all linearity runs. The first carryover blank sample injected after the ULOQ standard was assessed. The second carryover blank was assessed but was not part of the acceptance criteria. At least 50% of the first carryover blank samples injected after the ULOQ standard must be within acceptable interference as described below at the retention time of: The SIL peptide: peak area must be ≤20.0% of the mean peak area of the SIL peptide of the LLOQ standard(s). Furthermore, in the precision and accuracy as well as stability assessments, resolubilization buffer (RSB) samples were analyzed to assess carryover following injection of high QC samples. The sequence to assess carry-over was: High QC followed by two RSB samples.

Run Acceptance Criteria

As part of the validation, the precision and accuracy as well as stability runs included QC samples to demonstrate run acceptance. The following criteria must be met for the aforementioned runs to be considered valid. Each plant species/matrix was treated independently for acceptance criteria.

QC Samples

The QC samples provide the basis for accepting or rejecting a run. QC samples are prepared by fortifying the sample matrix with known concentrations of non-labeled peptides. The following acceptance criteria were used to confirm suitability of the QC samples using the low QC (QC1), midrange QC (QC2), high QC (QC3): (1) At least 50% of QC samples at each concentration low, mid and high must be within ±20.0% bias; (2) At least 67% of QC samples across low, mid and high concentrations must be within ±20.0% bias of their nominal values.

Precision and Accuracy

Precision is the degree of agreement among individual test results when the procedure is applied repeatedly to multiple samplings of a homogenous sample. Accuracy is the degree of agreement between the value found and an accepted reference value when the procedure is applied repeatedly to multiple samplings of a homogenous sample. In this study the precision and accuracy of the HPPD protein in each plant species/matrix for the LC-MS/MS assay was determined by assessing the assay-to-assay, and analyst-to-analyst variability.

Method precision and accuracy was evaluated using the QC samples. The precision and accuracy assays were performed with QC samples at three concentrations (low, mid and high) (Table 5 and Table 6). The QC samples were prepared in commodity crop extracts and fortified with non-labeled peptides.

Precision (CV) and accuracy (bias) were evaluated across three independent assay runs with two different analysts on three separate days.

Each precision and accuracy run consisted of three replicates per each QC concentration. QC0 (endogenous) was also included and analyzed in triplicate.

The % bias was calculated using the following formula:

$$\frac{\text{Measured Concentration of Fortified sample}(f\text{mol}/\text{mg}DW) - \text{Nominal Protein Concentration}(f\text{mol}/\text{mg}DW)}{\text{Nominal Protein Concentration}(f\text{mol}/\text{mg}DW)} \times 100$$

The precision and accuracy runs that met run acceptance criteria stated in section 0 were used to evaluate intra-assay precision and accuracy. The precision and accuracy runs meeting the intra-assay criteria were then used to evaluate the inter-assay precision and accuracy. The following acceptance criteria were used to confirm suitability of precision and accuracy assessment for intra- and inter-assay runs: (1) The CV for the QC0 samples must be ≤25.0%; (2) The CV for the low, mid, and high concentration QC samples must be ≤20.0% and within ±20.0% bias.

In addition, the maximum length of injection time of an assay run for study sample analysis was established by looking at the batch size of the precision and accuracy runs. The precision and accuracy run with the largest batch size was used for setting the maximum length of injection time for study sample analysis. Furthermore, a trend analysis of the QC0 (endogenous) samples was performed.

The extraction efficiency is the amount of protein of interest (i.e. HPPD) recovered from a matrix. The extraction efficiency was determined by consecutive sequential extractions. The extraction recovery is considered final if not more than 5.0% of the total protein is recovered in the last round. The efficiency of the protein extraction method was evaluated using commodity crops through iterative extractions of HPPD.

One analyst extracted three replicates of each commodity crop. The insoluble material was collected and extracted three more times, with each supernatant being retained for analysis.

The extraction efficiency for each sample was calculated using the following formula:

$$\frac{\text{Peak Area Ratio of Protein in first extraction}}{\text{Peak Area Ratio of Protein in all extractions summed}} \times 100$$

The following acceptance criteria were used to confirm the suitability of extraction efficiency for each protein: The sequential extractions will be considered completed when the final extraction results were not more than 5.0% of the total recovered material for each individual protein from all combined extractions:

$$\frac{\text{Peak Area Ratio of Protein in last extraction}}{\text{Peak Area Ratio of Protein in all extractions summed}} \times 100 \text{ is less than } 5.0\%$$

The extraction efficiency (average of replicates of the first iteration) is expected to be ≥60.0% recovery and the precision must be ≤20.0% for the first round of extraction.

Stability

The stability of the HPPD protein in a given plant species/matrix under specific conditions for a given time interval was assessed. Stability was determined for the HPPD protein in each plant species/matrix, for the surrogate peptides in processed samples.

Processed Samples Stability

The processed samples stability of dry extracts was analyzed at two different concentrations (low and high) with three replicates per concentration. The freshly prepared and processed QC samples were analyzed by LC-MS/MS (considered Day 0). The dry stability samples were not immediately analyzed by LC-MS/MS but were stored for a pre-determined time period.

Dry stability samples were stored at nominal temperature of −20° C. for 6 days (146 hours 16 minutes), then re-solubilized and analyzed by LC-MS/MS.

The following acceptance criteria were used to confirm the stability of surrogate peptides in processed samples: (1) Overall mean peak area ratio of the processed Day 0 and stability samples must be ≤25.0% CV; (2) The percentage difference of peak area ratios between stability and Day 0 QCs (processed on the same day of injection) must be within ±25.0%.

$$\% \text{ Difference} = \frac{(\text{Mean Peak Ratio of Stability samples} - \text{Mean Peak Ratio of Day 0 samples})}{\text{Mean Peak Ratio of Day 0 samples}} \times 100$$

As per the validation protocol, the carryover assessment is appropriately outlined in the general description where it is stated that peak area is used for the carryover evaluation however due to oversight the description found in the acceptance criteria states peak area ratio. Peak area is the correct way of performing the evaluation therefore in this study interference was assessed using peak areas. Therefore, there is no impact on data quality and integrity since the suitable approach for evaluating interference in the carry-over blanks was applied (i.e. peak areas).

As per the validation protocol, Peak Area ratio (SIL/non-labeled) for each peptide of the quantifier transition is used for plotting calibration curve data on a linear scale. However Peak Area for each peptide of the quantifier transition was used instead for plotting. Peak area ratio cannot be used for linearity assessment due to contribution to the non-labeled signal from the stable isotope labeled peptide at high spiking concentrations. There is no impact on the data quality and integrity since a linearity assessment was performed.

As per the validation protocol, the extraction efficiency evaluation is performed using 4 sequential extractions (rounds). For two matrices (i.e. barley and wheat seed) the extraction efficiency results did not meet acceptance criteria as outlined below.

Barley seed—Final extraction (4th round) result was 8.2% (Acceptance Criteria: <5.0%)

Wheat seed—Final extraction (4th round) result was 6.2% (Acceptance Criteria: <5.0%).

Precision of the 1st round of extraction was 27.5% CV (Acceptance criteria: ≤20.0%).

However, there is no impact on the outcome of the study since: (1) The final extraction results for barley and wheat seed show that the extraction of HPPD protein is near completion after four extraction rounds. Furthermore, the concentration of HPPD in samples analysis will be determined from a single extraction (first round) and adjusted for % extraction efficiency; and (2) For wheat seed, the precision of the first round of extraction (27.5% CV) exceeds the 20.0% CV criteria, however the Precision and Accuracy results for the QC0 (endogenous) from three validation runs (Run 4 to 6) coming from a single extraction demonstrate that a precision ≤20.0% was achieved.

As per the validation protocol, for each precision and accuracy runs, two (2) RSB samples are injected after the high QC sample at the end of each matrix. However for one matrix (i.e. wheat seed), the RSB samples injected after the high QC sample (QC3 replicate 3) were acquired using the MRM method for peptide GNFSQLFK (SEQ ID NO:2) rather than peptide GNFSELFK (SEQ ID NO:1) due to oversight. Therefore the RSB carryover assessment was not performed for wheat seed.

However, there is no impact on the outcome of the study since: (1) Carryover of peptide GNFSELFK (SEQ ID NO:1) was not observed for any of the other matrices (including wheat forage), therefore the overall conclusion is that peptide GNFSELFK (SEQ ID NO:1) did not display any propensity for carryover and it can be inferred that carry over of peptide GNFSELFK for wheat seed matrix is highly improbable; and (2) As a consequence, the available dataset allows for establishing RSB carryover acceptance criteria (i.e. ≤5.0% at RT of non-labeled peptide peak area vs. QC0 peak area) to be used in sample analysis for all matrices (including wheat seed) with regard to peptide GNFSELFK (SEQ ID NO:1) as well as GNFSQLFK (SEQ ID NO:2).

There were also minor SOP deviations which had no impact on the study. These are documented in the study file. No other circumstances occurred during the conduct of this study that would have adversely affected the quality or integrity of the data generated.

Specificity

The assay specificity was assessed for the non-labeled and SIL peptides in all commodity crop extracts. The evaluation showed some minor interference at the retention times of the surrogate peptides and corresponding SIL peptides in the commodity crop samples that were tested. For the non-labeled peptides, the percentage difference in the average ratio of the two transitions between the blank and buffer sample was below 30.0% in all plant species/matrices tested and all interferences were ≤5.0% of the mean peak area of the SIL peptides in QC0 (endogenous) samples, meeting the specificity acceptance criteria.

Linearity

The linearity was determined for HPPD protein in each plant species/matrix using reverse curves as described in section 3.4 and 0. The simplest regression model that defined the reverse curve was used i.e. a linear regression. A data weighting of 1/x was used for all plant species/matrices. Table 10 summarizes the standard curve parameters (slope, intercept and R value) for the linearity assessment. The coefficient of correlation (R) for the standard curves for HPPD protein in each plant species/matrix was ≥0.9900. All of the established data fell within the acceptance criteria as described in section 0 and were found to be suitable for the linearity assessment.

TABLE 10

Reverse Curve Parameters in Commodity Crops for Linear Equation with a Weighting Factor of 1/x

| Plant Species/Matrix | Slope | Intercept | R Value |
|---|---|---|---|
| Barley Seed | 4411.65175 | 1324.06523 | 0.99926 |
| Maize Seed | 11316.54172 | −1089.93977 | 0.99875 |
| Rice Seed | 11555.29853 | −1882.67744 | 0.99918 |
| Soybean Seed | 1487.10444 | −2985.15028 | 0.99920 |
| Wheat Seed | 3370.40265 | −64.67755 | 0.99946 |
| Barley Forage | 1808.14443 | 1142.86508 | 0.99920 |
| Maize Forage | 4003.01356 | −2528.34723 | 0.99921 |
| Oat Forage | 1420.89325 | 39.29666 | 0.99926 |
| Soybean Forage | 1046.53458 | −3246.28194 | 0.99927 |
| Wheat Forage | 1506.99030 | −1060.27312 | 0.99952 |

The back-calculated reverse curve standard concentrations in each plant species/matrix are provided in Table 11.

TABLE 11

Back-Calculated Reverse Curve Standard Concentrations in Commodity Crops

Reverse Curve Standard Concentrations (fmol/mg DW)

| Plant Species/Matrix | | STD 1 (LLOQ) | STD 2 | STD 3 | STD 4 | STD 5 | STD 6 | STD 7 | STD 8 (ULOQ) |
|---|---|---|---|---|---|---|---|---|---|
| Barley Seed | Nominal | 4.520 | 9.040 | 22.600 | 45.200 | 90.400 | 180.800 | 226.000 | 271.200 |
| | Mean | 4.846 | 8.977 | 21.563 | 44.481 | 89.938 | 177.504 | 227.040 | 275.412 |
| | % CV | 4.6 | 5.3 | 0.8 | 1.2 | 2.1 | 0.4 | 7.6 | 2.8 |
| | % bias | 7.2 | −0.7 | −4.6 | −1.6 | −0.5 | −1.8 | 0.5 | 1.6 |
| Maize Seed | Nominal | 2.585 | 5.169 | 12.923 | 25.846 | 51.692 | 103.385 | 129.231 | 155.077 |
| | Mean | 2.712 | 5.090 | 12.045 | 26.226 | 52.152 | 105.102 | 133.364 | 149.219 |
| | % CV | 7.2 | 5.1 | 1.3 | 3.5 | 4.7 | 5.4 | 3.1 | 5.7 |
| | % bias | 4.9 | −1.5 | −6.8 | 1.5 | 0.9 | 1.7 | 3.2 | −3.8 |
| Rice Seed | Nominal | 1.776 | 3.551 | 8.879 | 17.757 | 35.514 | 71.029 | 88.786 | 106.543 |
| | Mean | 1.852 | 3.510 | 8.552 | 17.076 | 37.601 | 70.535 | 87.819 | 106.892 |
| | % CV | 5.3 | 3.1 | 3.7 | 5.6 | 3.3 | 7.0 | 0.8 | 1.7 |
| | % bias | 4.3 | −1.2 | −3.7 | −3.8 | 5.9 | −0.7 | −1.1 | 0.3 |
| Soybean Seed | Nominal | 14.054 | 28.108 | 70.269 | 140.538 | 281.077 | 562.154 | 702.692 | 843.231 |
| | Mean | 14.776 | 27.013 | 69.163 | 144.660 | 276.891 | 549.382 | 679.999 | 880.241 |
| | % CV | 2.5 | 4.7 | 3.2 | 1.8 | 4.0 | 1.2 | 0.8 | 1.9 |
| | % bias | 5.1 | −3.9 | −1.6 | 2.9 | −1.5 | −2.3 | −3.2 | 4.4 |

TABLE 11-continued

Back-Calculated Reverse Curve Standard Concentrations in Commodity Crops

Reverse Curve Standard Concentrations (fmol/mg DW)

| Plant Species/Matrix | | STD 1 (LLOQ) | STD 2 | STD 3 | STD 4 | STD 5 | STD 6 | STD 7 | STD 8 (ULOQ) |
|---|---|---|---|---|---|---|---|---|---|
| Wheat Seed | Nominal | 6.457 | 12.914 | 32.286 | 64.571 | 129.143 | 258.286 | 322.857 | 387.429 |
| | Mean | 6.586 | 12.578 | 32.427 | 65.641 | 125.242 | 265.315 | 320.769 | 385.387 |
| | % CV | 3.6 | 5.9 | 6.5 | 5.2 | 4.6 | 3.4 | 2.4 | 2.7 |
| | % bias | 2.0 | −2.6 | 0.4 | 1.7 | −3.0 | 2.7 | −0.6 | −0.5 |
| Barley Forage | Nominal | 11.300 | 22.600 | 56.500 | 113.000 | 226.000 | 452.000 | 565.000 | 678.000 |
| | Mean | 11.951 | 22.879 | 53.533 | 110.325 | 229.285 | 444.169 | 549.348 | 702.912 |
| | % CV | 9.3 | 0.9 | 1.1 | 4.8 | 3.6 | 0.7 | 4.8 | 1.2 |
| | % bias | 5.8 | 1.2 | −5.3 | −2.4 | 1.5 | −1.7 | −2.8 | 3.7 |
| Maize Forage | Nominal | 6.941 | 13.883 | 34.707 | 69.414 | 138.829 | 277.657 | 347.071 | 416.486 |
| | Mean | 7.390 | 13.976 | 32.974 | 67.648 | 138.373 | 277.929 | 344.462 | 422.237 |
| | % CV | 4.0 | 3.5 | 0.6 | 5.2 | 1.7 | 7.2 | 1.6 | 5.0 |
| | % bias | 6.5 | 0.7 | −5.0 | −2.5 | −0.3 | 0.1 | −0.8 | 1.4 |
| Oat Forage | Nominal | 14.044 | 28.089 | 70.221 | 140.443 | 280.886 | 561.771 | 702.214 | 842.657 |
| | Mean | 13.936 | 28.387 | 68.116 | 144.296 | 284.993 | 559.663 | 674.546 | 866.389 |
| | % CV | 1.8 | 0.8 | 1.9 | 3.5 | 4.1 | 4.2 | 1.2 | 2.8 |
| | % bias | 48 | 1.1 | −3.0 | 2.7 | 1.5 | −0.4 | −3.9 | 2.8 |
| Soybean Forage | Nominal | 20.501 | 41.003 | 102.507 | 205.014 | 410.029 | 820.057 | 1025.071 | 1230.086 |
| | Mean | 22.248 | 40.651 | 100.303 | 195.691 | 403.086 | 815.038 | 997.191 | 1280.062 |
| | % CV | 4.8 | 0.2 | 0.7 | 2.2 | 1.7 | 3.0 | 3.4 | 0.7 |
| | % bias | 8.5 | −0.9 | −2.2 | −4.5 | −1.7 | −0.6 | −2.7 | 4.1 |
| Wheat Forage | Nominal | 13.721 | 27.443 | 68.607 | 137.214 | 274.429 | 548.857 | 686.071 | 823.286 |
| | Mean | 13.954 | 26.922 | 67.581 | 139.675 | 270.208 | 571.268 | 673.942 | 816.079 |
| | % CV | 4.5 | 2.0 | 0.5 | 0.9 | 4.5 | 0.3 | 3.5 | 0.6 |
| | % bias | 1.7 | −1.9 | −1.5 | 1.8 | −1.5 | 4.1 | −1.8 | −0.9 |

N = 2 for each standard of each plant species/matrix

Limits of Quantitation

In the linearity assessment, the accuracy (bias) was within ±25.0% and ±20.0% for the LLOQ and ULOQ samples respectively (Table 11), therefore the limits of quantitation were set at the concentration of the lowest and highest non-zero standard. Table 12 summarizes the lower and upper limits of quantitation for HPPD in each plant species/matrix.

TABLE 12

Limits of Quantitation for HPPD in Commodity Crops

| | LLOQ | | ULOQ | |
|---|---|---|---|---|
| Plant Species/Matrix | fmol/mg DW | µg/g DW | fmol/mg DW | µg/g DW |
| Barley Seed | 4.520 | 0.209 | 271.200 | 12.567 |
| Maize Seed | 2.585 | 0.122 | 155.077 | 7.289 |
| Rice Seed | 1.776 | 0.083 | 106.543 | 5.001 |
| Soybean Seed | 14.054 | 0.686 | 843.231 | 41.161 |
| Wheat Seed | 6.457 | 0.301 | 387.429 | 18.060 |
| Barley Forage | 11.300 | 0.524 | 678.000 | 31.418 |
| Maize Forage | 6.941 | 0.326 | 416.486 | 19.576 |
| Oat Forage | 14.044 | 0.660 | 842.657 | 39.602 |
| Soybean Forage | 20.501 | 1.001 | 1230.086 | 60.045 |
| Wheat Forage | 13.721 | 0.640 | 823.286 | 38.378 |

The quantitative range for HPPD in each plant species/matrix is the interval between the lower (LLOQ) and upper (ULOQ) concentrations for which it has been demonstrated that the analytical procedure has a suitable level of accuracy. The LLOQ and ULOQ samples met the accuracy criteria for HPPD in each plant species/matrix. The quantitative range of the method was set for each plant species/matrix (Table 13).

TABLE 13

Quantitative Ranges of HPPD in Commodity Crops

| Plant Species/Matrix | Quantitative Range (fmol/mg DW) | Quantitative Range (µg/g DW) |
|---|---|---|
| Barley Seed | 4.520 to 271.200 | 0.209 to 12.567 |
| Maize Seed | 2.585 to 155.077 | 0.122 to 7.289 |
| Rice Seed | 1.776 to 106.543 | 0.083 to 5.001 |
| Soybean Seed | 14.054 to 843.231 | 0.686 to 41.161 |
| Wheat Seed | 6.457 to 387.429 | 0.301 to 18.060 |
| Barley Forage | 11.300 to 678.000 | 0.524 to 31.418 |
| Maize Forage | 6.941 to 416.486 | 0.326 to 19.576 |
| Oat Forage | 14.044 to 842.657 | 0.660 to 39.602 |
| Soybean Forage | 20.501 to 1230.086 | 1.001 to 60.045 |
| Wheat Forage | 13.721 to 823.286 | 0.640 to 38.378 |

Carryover

Carry-over was determined in the linearity evaluation by assessing blank samples injected after the ULOQ standard for the commodity crop samples that were tested. The evaluation showed no interference at the retention times of the SIL peptide. The SIL peptide peak area ratio was ≤20.0% of the mean peak area ratio of the SIL peptide of the LLOQ standard(s) in at least 50% of the first carryover blank samples injected after the ULOQ standard, meeting the carryover acceptance criteria.

Furthermore carryover was evaluated during precision and accuracy as well as stability runs with the use of RSB samples following injection of high QC samples. Overall the evaluation showed no carry-over in the blank samples. The RSB blank carryover acceptance criteria for study sample analysis will be ≤5.0% of the mean peak area of the non-labeled peptides in QC0 (endogenous) samples.

Precision and Accuracy

The precision and accuracy of the HPPD method for commodity crops was evaluated using the QC samples described herein. There were three precision and accuracy runs. All met the run acceptance criteria. Precision (CV) and accuracy (bias) data for intra- and inter-assay runs are summarized in Table 14 to Table 23 (one table per plant species/matrix).

For both intra- and inter-assay, the CV was less than 25.0% for the QC0 samples and less than 20.0% for the low, mid and high QC samples, therefore, the method precision assessment was suitable.

For both intra- and inter-assay, the bias was within ±20.0% for the low, mid and high QC samples; therefore the method accuracy assessment was suitable.

The longest injection time of a precision and accuracy batch was approximately 36 hours 58 minutes (batch size of 187 injections) therefore this was established as the maximum length of injection time of an assay for study sample analysis.

A trend analysis of the QC0 (endogenous) samples from the precision and accuracy runs was performed. The QC0 (endogenous) sample was also analyzed for samples analysis in order to extend the trend analysis.

TABLE 14

Intra- and Inter-Assay Precision and Accuracy Results for HPPD in Barley Seed

| Plant Species/ Matrix | Run | QC Sample Concentration (fmol/mg DW) | | | |
|---|---|---|---|---|---|
| | | QC 0 (endo) | QC 1 | QC 2 | QC 3 |
| Barley Seed | 4 | Nominal | — | 35.165 | 89.400 | 202.391 |
| | | Mean | 21.606 | 34.357 | 90.749 | 192.645 |
| | | % CV | 4.7 | 0.8 | 3.4 | 1.8 |
| | | % bias | N/Ap | −2.3 | 1.5 | −4.8 |
| | 5 | Nominal | — | 35.925 | 90.160 | 203.151 |
| | | Mean | 22.366 | 35.232 | 82.585 | 191.400 |
| | | % CV | 1.9 | 5.5 | 2.1 | 2.5 |
| | | % bias | N/Ap | −1.9 | −8.4 | −5.8 |
| | 6 | Nominal | — | 35.007 | 89.242 | 202.233 |
| | | Mean | 21.448 | 33.163 | 84.298 | 186.075 |
| | | % CV | 1.5 | 1.5 | 2.8 | 1.1 |
| | | % bias | N/Ap | −5.3 | −5.5 | −8.0 |
| | Overall | Mean | 21.806 | 34.250 | 85.877 | 190.040 |
| | | % CV | 3.3 | 4.0 | 5.0 | 2.3 |
| | | % bias | N/Ap | −3.2 | −4.1 | −6.2 |

Nominal = Actual concentrations used for calculations
N = 3 for each QC in each run
N/Ap = not applicable

TABLE 15

Intra- and Inter-Assay Precision and Accuracy Results for HPPD in Maize Seed

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Maize Seed | 4 | Nominal | — | 17.153 | 48.170 | 112.788 |
| | | Mean | 9.399 | 16.581 | 45.943 | 109.282 |
| | | % CV | 2.8 | 1.3 | 0.7 | 0.5 |
| | | % bias | N/Ap | −3.3 | −4.6 | −3.1 |
| | 5 | Nominal | — | 17.264 | 48.281 | 112.899 |
| | | Mean | 9.510 | 17.204 | 44.058 | 104.704 |
| | | % CV | 6.7 | 2.0 | 1.1 | 3.4 |
| | | % bias | N/Ap | −0.3 | −8.7 | −7.3 |
| | 6 | Nominal | — | 16.664 | 47.681 | 112.299 |
| | | Mean | 8.910 | 15.390 | 41.133 | 90.452 |
| | | % CV | 4.6 | 3.1 | 1.0 | 0.5 |
| | | % bias | N/Ap | −7.6 | −13.7 | −19.5 |

TABLE 15-continued

Intra- and Inter-Assay Precision and Accuracy Results for HPPD in Maize Seed

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| | Overall | Mean | 9.273 | 16.392 | 43.711 | 101.479 |
| | | % CV | 5.2 | 5.2 | 4.9 | 8.6 |
| | | % bias | N/Ap | −3.8 | −9.0 | −9.9 |

Nominal = Actual concentrations used for calculations
N = 3 for each QC in each run
N/Ap = not applicable

TABLE 16

Intra- and Inter-Assay Precision and Accuracy Results for HPPD in Rice Seed

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Rice Seed | 4 | Nominal | — | 18.316 | 39.623 | 84.012 |
| | | Mean | 12.989 | 18.246 | 39.261 | 80.176 |
| | | % CV | 2.0 | 0.2 | 1.2 | 1.6 |
| | | % bias | N/Ap | −0.4 | −0.9 | −4.6 |
| | 5 | Nominal | — | 18.770 | 40.077 | 84.466 |
| | | Mean | 13.443 | 18.313 | 37.925 | 79.321 |
| | | % CV | 1.0 | 2.6 | 1.6 | 0.3 |
| | | % bias | N/Ap | −2.4 | −5.4 | −6.1 |
| | 6 | Mean | — | 18.199 | 39.506 | 83.895 |
| | | % CV | 12.872 | 17.776 | 37.534 | 78.577 |
| | | % bias | 1.5 | 2.8 | 1.6 | 0.9 |
| | Overall | Mean | 13.102 | 18.112 | 38.240 | 79.358 |
| | | % CV | 2.4 | 2.4 | 2.4 | 1.3 |
| | | % bias | N/Ap | −1.7 | −3.8 | −5.7 |

Nominal = Actual concentrations used for calculations
N = 3 for each QC in each run
N/Ap = not applicable

TABLE 17

Intra- and Inter-Assay Precision and Accuracy Results for HPPD in Soybean Seed

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Soybean Seed | 4 | Nominal | — | 69.443 | 238.075 | 589.393 |
| | | Mean | 27.285 | 66.423 | 231.098 | 564.305 |
| | | % CV | 4.8 | 1.3 | 4.1 | 2.9 |
| | | % bias | N/Ap | −4.3 | −2.9 | −4.3 |
| | 5 | Nominal | — | 70.057 | 238.689 | 590.007 |
| | | Mean | 27.899 | 65.957 | 221.397 | 554.994 |
| | | % CV | 1.9 | 1.6 | 3.0 | 0.5 |
| | | % bias | N/Ap | −5.9 | −7.2 | −5.9 |
| | 6 | Nominal | — | 69.542 | 238.174 | 589.492 |
| | | Mean | 27.384 | 63.345 | 222.298 | 558.821 |
| | | % CV | 2.9 | 0.7 | 1.5 | 4.0 |
| | | % bias | N/Ap | −8.9 | −6.7 | −5.2 |
| | Overall | Mean | 27.523 | 65.242 | 224.931 | 559.373 |
| | | % CV | 3.1 | 2.5 | 3.4 | 2.6 |
| | | % bias | N/Ap | −6.4 | −5.6 | −5.1 |

Nominal = Actual concentrations used for calculations
N = 3 for each QC in each run
N/Ap = not applicable

TABLE 18

Intra- and Inter-Assay Precision and Accuracy Results for HPPD in Wheat Seed

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Wheat Seed | 4 | Nominal | — | 29.025 | 106.504 | 267.920 |
| | | Mean | 9.655 | 27.583 | 104.898 | 249.407 |
| | | % CV | 3.3 | 3.7 | 2.3 | 1.9 |
| | | % bias | N/Ap | −5.0 | −1.5 | −6.9 |
| | 5 | Nominal | — | 29.356 | 106.835 | 268.251 |
| | | Mean | 9.986 | 26.971 | 96.079 | 248.314 |
| | | % CV | 3.5 | 0.8 | 1.4 | 1.9 |
| | | % bias | N/Ap | −8.1 | −10.1 | −7.4 |
| | 6 | Nominal | — | 28.888 | 106.367 | 267.783 |
| | | Mean | 9.518 | 26.072 | 98.070 | 247.141 |
| | | % CV | 2.7 | 2.0 | 2.1 | 0.8 |
| | | % bias | N/Ap | −9.7 | −7.8 | −7.7 |
| | Overall | Mean | 9.720 | 26.875 | 99.682 | 248.287 |
| | | % CV | 3.5 | 3.3 | 4.4 | 1.5 |
| | | % bias | N/Ap | −7.6 | −6.5 | −7.4 |

Nominal = Actual concentrations used for calculations
N = 3 for each QC in each run
N/Ap = not applicable

TABLE 19

Intra- and Inter-Assay Precision and Accuracy Results for HPPD in Barley Forage

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Barley Forage | 4 | Nominal | — | 81.820 | 217.409 | 499.886 |
| | | Mean | 47.923 | 78.550 | 193.554 | 405.369 |
| | | % CV | 4.1 | 0.5 | 2.9 | 2.6 |
| | | % bias | N/Ap | −4.0 | −11.0 | −18.9 |
| | 5 | Nominal | — | 85.186 | 220.775 | 503.252 |
| | | Mean | 51.289 | 80.505 | 191.912 | 437.244 |
| | | % CV | 5.8 | 3.7 | 2.2 | 5.4 |
| | | % bias | N/Ap | −5.5 | −13.1 | −13.1 |
| | 6 | Nominal | — | 81.988 | 217.577 | 500.054 |
| | | Mean | 48.091 | 76.829 | 184.943 | 410.701 |
| | | % CV | 4.7 | 1.0 | 1.8 | 4.2 |
| | | % bias | N/Ap | −6.3 | −15.0 | −17.9 |
| | Overall | Mean | 49.101 | 78.628 | 190.136 | 417.771 |
| | | % CV | 5.4 | 2.8 | 2.9 | 5.1 |
| | | % bias | N/Ap | −5.3 | −13.0 | −16.6 |

Nominal = Actual concentrations used for calculations
N = 3 for each QC in each run
N/Ap = not applicable

TABLE 20

Intra- and Inter-Assay Precision and Accuracy Results for HPPD in Maize Forage

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Maize Forage | 4 | Nominal | — | 39.271 | 122.572 | 296.114 |
| | | Mean | 18.446 | 38.431 | 116.655 | 278.998 |
| | | % CV | 1.8 | 1.1 | 1.0 | 1.1 |
| | | % bias | N/Ap | −2.1 | −4.8 | −5.8 |
| | 5 | Nominal | — | 40.864 | 124.165 | 297.707 |
| | | Mean | 20.039 | 38.792 | 110.403 | 271.007 |
| | | % CV | 1.4 | 1.4 | 4.9 | 3.0 |
| | | % bias | N/Ap | −5.1 | −11.1 | −9.0 |
| | 6 | Nominal | — | 37.976 | 121.277 | 294.819 |
| | | Mean | 17.151 | 34.744 | 102.368 | 251.701 |
| | | % CV | 3.1 | 0.9 | 4.0 | 4.8 |
| | | % bias | N/Ap | −8.5 | −15.6 | −14.6 |
| | Overall | Mean | 18.545 | 37.322 | 109.809 | 267.235 |
| | | % CV | 7.0 | 5.3 | 6.4 | 5.3 |
| | | % bias | N/Ap | −5.2 | −10.5 | −9.8 |

Nominal = Actual concentrations used for calculations
N = 3 for each QC in each run
N/Ap = not applicable

TABLE 21

Intra- and Inter-Assay Precision and Accuracy Results for HPPD in Oat Forage

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Oat Forage | 4 | Nominal | — | 89.741 | 258.259 | 609.337 |
| | | Mean | 47.612 | 90.569 | 254.083 | 560.642 |
| | | % CV | 2.2 | 1.7 | 1.1 | 0.4 |
| | | % bias | N/Ap | 0.9 | −1.6 | −8.0 |
| | 5 | Nominal | — | 91.916 | 260.434 | 611.512 |
| | | Mean | 49.787 | 87.243 | 232.532 | 562.473 |
| | | % CV | 8.6 | 2.1 | 1.7 | 1.3 |
| | | % bias | N/Ap | −5.1 | −10.7 | −8.0 |
| | 6 | Nominal | — | 89.184 | 257.702 | 608.780 |
| | | Mean | 47.055 | 85.524 | 237.272 | 568.318 |
| | | % CV | 3.3 | 0.6 | 2.1 | 2.5 |
| | | % bias | N/Ap | −4.1 | −7.9 | −6.6 |
| | Overall | Mean | 48.151 | 87.779 | 241.296 | 563.811 |
| | | % CV | 5.5 | 2.9 | 4.3 | 1.5 |
| | | % bias | N/Ap | −2.8 | −6.8 | −7.6 |

Nominal = Actual concentrations used for calculations
N = 3 for each QC in each run
N/Ap = not applicable

TABLE 22

Intra- and Inter-Assay Precision and Accuracy Results for HPPD in Soybean Forage

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Soybean Forage | 4 | Nominal | — | 81.488 | 327.485 | 839.979 |
| | | Mean | 19.989 | 79.634 | 317.915 | 781.981 |
| | | % CV | 5.1 | 4.4 | 1.5 | 0.7 |
| | | % bias | N/Ap | −2.3 | −2.9 | −6.9 |
| | 5 | Nominal | — | 80.962 | 326.959 | 839.453 |
| | | Mean | 19.463 | 75.541 | 289.104 | 781.906 |
| | | % CV | 2.4 | 3.1 | 2.7 | 1.1 |
| | | % bias | N/Ap | −6.7 | −11.6 | −6.9 |
| | 6 | Nominal | — | 79.889 | 325.886 | 838.380 |
| | | Mean | 18.390 | 73.556 | 309.219 | 795.280 |
| | | % CV | 0.9 | 0.6 | 4.0 | 2.5 |
| | | % bias | N/Ap | −7.9 | −5.1 | −5.1 |

TABLE 22-continued

Intra- and Inter-Assay Precision and Accuracy Results for HPPD in Soybean Forage

| Plant Species/ Matrix | Run | QC Sample Concentration (fmol/mg DW) | | | |
|---|---|---|---|---|---|
| | | QC 0 (endo) | QC 1 | QC 2 | QC 3 |
| | Overall Mean | 19.280 | 76.244 | 305.413 | 786.389 |
| | % CV | 4.7 | 4.5 | 4.9 | 1.6 |
| | % bias | N/Ap | −5.6 | −6.5 | −6.3 |

Nominal = Actual concentrations used for calculations
N = 3 for each QC in each run
N/Ap = not applicable

TABLE 23

Intra- and Inter-Assay Precision and Accuracy Results for HPPD in Wheat Forage

| Plant Species/ Matrix | Run | | QC Sample Concentration (fmol/mg DW) | | | |
|---|---|---|---|---|---|---|
| | | | QC 0 (endo) | QC 1 | QC 2 | QC 3 |
| Wheat Forage | 4 | Nominal | — | 79.853 | 244.497 | 587.504 |
| | | Mean | 38.692 | 78.642 | 242.896 | 556.087 |
| | | % CV | 1.6 | 1.5 | 1.9 | 2.3 |
| | | % bias | N/Ap | −1.5 | −0.7 | −5.3 |
| | 5 | Nominal | — | 82.721 | 247.365 | 590.372 |
| | | Mean | 41.560 | 76.780 | 226.970 | 530.906 |
| | | % CV | 6.2 | 1.7 | 0.9 | 4.8 |
| | | % bias | N/Ap | −7.2 | −8.2 | −10.1 |
| | 6 | Nominal | — | 78.362 | 243.006 | 586.013 |
| | | Mean | 37.201 | 74.375 | 223.243 | 533.051 |
| | | % CV | 1.6 | 1.9 | 2.8 | 1.6 |
| | | % bias | N/Ap | −5.1 | −8.1 | −9.0 |
| | Overall | Mean | 39.151 | 76.599 | 231.036 | 540.015 |
| | | % CV | 6.0 | 2.8 | 4.3 | 3.6 |
| | | % bias | N/Ap | −4.6 | −5.7 | −8.2 |

Nominal = Actual concentrations used for calculations
N = 3 for each QC in each run
N/Ap = not applicable

Extraction Efficiency

Table 24 summarizes the efficiency of the protein extraction method from commodity crops. All plant species/matrices for HPPD reached acceptable extraction efficiency at a single iteration. The mean extraction efficiencies of HPPD from barley seed (59.9%), maize seed (69.8%), rice seed (73.9%), soybean seed (64.9%), wheat seed (54.3%), barley forage (69.8%), maize forage (76.3%), oat forage (78.4%), soybean forage (65.4%) and wheat forage (77.2%) demonstrate that the method meets an acceptable extraction efficiency assessment. Moreover, the CV value was below 20.0% for HPPD in all plant species/matrices and the amount in the final extraction was below 5.0% for all commodity crops except for barley and wheat seed.

TABLE 24

Extraction Efficiency of HPPD from Commodity Crops

| Plant Species/ Matrix | Mean Extraction Efficiency of Protein (%) | % CV | Mean of the Final Extraction (%) |
|---|---|---|---|
| Barley Seed | 59.9 | 3.4 | *__8.2__* |
| Maize Seed | 69.8 | 9.6 | 4.7 |
| Rice Seed | 73.9 | 10.7 | 2.5 |
| Soybean Seed | 64.9 | 4.8 | 4.7 |
| Wheat Seed | 54.3 | *__27.5__* | *__6.2__* |
| Barley Forage | 69.8 | 3.2 | 2.3 |
| Maize Forage | 76.3 | 2.2 | 1.9 |
| Oat Forage | 78.4 | 7.7 | 1.4 |
| Soybean Forage | 65.4 | 8.6 | 4.0 |
| Wheat Forage | 77.2 | 1.4 | 1.7 |

N = 4 extraction iterations and three replicates per iteration
Extraction efficiency was performed in run 3
See Appendix A, Table A14 for details
Values in italic and bold are outside acceptance criteria, refer to section 5.1.3

Table 25 summarizes the dry extract stability of surrogate peptides at a nominal temperature of −20° C. for 6 days (146 hours 16 minutes). The mean peak response ratio of the stability samples was ≤25.0% CV and the % difference of the stability samples when compared to the Day 0 QC samples was within ±25.0% for the dry processed samples stability assessment.

TABLE 25

Stability of Commodity Crop Dry Extracts at a Nominal Temperature of −20° C. for 6 Days (146 Hours 16 Minutes)

| Plant Species/ Matrix | | Peak Area Ratio of QC Samples | | | |
|---|---|---|---|---|---|
| | | Day 0 | | Stability | |
| | | QC 1 | QC 3 | QC 1 | QC 3 |
| Barley Seed | Mean | 1.5202 | 8.5241 | 1.5545 | 8.7697 |
| | % CV | 0.8 | 1.8 | 2.8 | 3.3 |
| | % Difference[a] | N/Ap | | 2.3 | 2.9 |
| Maize Seed | Mean | 1.2830 | 8.4564 | 1.2975 | 8.0179 |
| | % CV | 1.3 | 0.5 | 3.8 | 1.6 |
| | % Difference[a] | N/Ap | | 1.1 | −5.2 |
| Rice Seed | Mean | 2.0550 | 9.0298 | 2.0270 | 8.7436 |
| | % CV | 0.2 | 1.6 | 3.2 | 2.0 |
| | % Difference[a] | N/Ap | | −1.4 | −3.2 |
| Soybean Seed | Mean | 0.9453 | 8.0306 | 0.9219 | 7.6973 |
| | % CV | 1.3 | 2.9 | 4.6 | 1.0 |
| | % Difference[a] | N/Ap | | −2.5 | −4.2 |

TABLE 25-continued

Stability of Commodity Crop Dry Extracts at a Nominal
Temperature of −20° C. for 6 Days (146 Hours 16 Minutes)

| Plant Species/ Matrix | | Peak Area Ratio of QC Samples | | | |
|---|---|---|---|---|---|
| | | Day 0 | | Stability | |
| | | QC 1 | QC 3 | QC 1 | QC 3 |
| Wheat Seed | Mean | 0.8543 | 7.7249 | 0.8889 | 8.1248 |
| | % CV | 3.7 | 1.9 | 3.0 | 0.5 |
| | % Difference[a] | N/Ap | | 4.0 | 5.2 |
| Barley Forage | Mean | 1.3903 | 7.1747 | 1.6767 | 8.2002 |
| | % CV | 0.5 | 2.6 | 5.2 | 1.5 |
| | % Difference[a] | N/Ap | | 20.6 | 14.3 |
| Maize Forage | Mean | 1.1073 | 8.0387 | 1.0890 | 7.7595 |
| | % CV | 1.1 | 1.1 | 2.1 | 1.0 |
| | % Difference[a] | N/Ap | | −1.7 | −3.5 |
| Oat Forage | Mean | 1.2898 | 7.9840 | 1.2859 | 8.4485 |
| | % CV | 1.7 | 0.4 | 3.5 | 3.6 |
| | % Difference[a] | N/Ap | | −0.3 | 5.8 |
| Soybean Forage | Mean | 0.7769 | 7.6286 | 0.7813 | 7.9080 |
| | % CV | 4.4 | 0.7 | 10.6 | 2.8 |
| | % Difference[a] | N/Ap | | 0.6 | 3.7 |
| Wheat Forage | Mean | 1.1463 | 8.1054 | 1.1414 | 8.5251 |
| | % CV | 1.5 | 2.3 | 4.5 | 4.3 |
| | % Difference[a] | N/Ap | | −0.4 | 5.2 |

N = 3 for all QC;
N/Ap = not applicable
[a]% Difference = (Stability QC − Day 0 QC)/Day 0 QC × 100
Dry stability was performed in run 7
Refer to Appendix A, Table A15 for details The purpose of this study was to validate the MS-based method for quantification of p-hydroxyphenylpyruvate dioxygenase (HPPD) protein in various commodity crops (barley, maize, rice, soybean, and wheat seed, and, barley, maize, oat, soybean and wheat forage) using LC-MS/MS. Surrogate peptides that are unique to the HPPD protein were used to determine the relative concentration. Commodity crop samples were used to evaluate method performance parameters including specificity, linearity, limits of quantitation, carryover, precision and accuracy, extraction efficiency and stability.

Evaluation of specificity showed no significant interference at the retention time of the non-labeled peptides (<30.0% difference in the average ratio of the two transitions between the blank and buffer) and SIL peptides (≤5.0% of SIL signal of QC0 (endogenous)) in any of the commodity crop samples that were tested. All specificity parameters met acceptance criteria.

The lower limit of quantitation and the quantitative range in fmol/mg DW and µg/g DW for HPPD in the commodity crops are shown in Table 26.

TABLE 26

List of Commodity Crops, Surrogate Peptides,
Lower Limit of Quantitation and Quantitative Range

| Plant Species/ Matrix | Surrogate Peptide | Lower Limit of Quantitation | | Quantitative Range | |
|---|---|---|---|---|---|
| | | fmol/mg DW | µg/g DW | fmol/mg DW | µg/g DW |
| Barley Seed | SEQ ID NO: 1 | 4.520 | 0.209 | 4.520 to 271.200 | 0.209 to 12.567 |
| Maize Seed | SEQ ID NO: 12 | 2.585 | 0.122 | 2.585 to 155.077 | 0.122 to 7.289 |
| Rice Seed | SEQ ID NO: 1 | 1.776 | 0.083 | 1.776 to 106.543 | 0.083 to 5.001 |
| Soybean Seed | SEQ ID NO: 1 | 14.054 | 0.686 | 14.054 to 843.231 | 0.686 to 41.161 |
| Wheat Seed | SEQ ID NO: 1 | 6.457 | 0.301 | 6.457 to 387.429 | 0.301 to 18.060 |
| Barley Forage | SEQ ID NO: 1 | 11.300 | 0.524 | 11.300 to 678.000 | 0.524 to 31.418 |
| Maize Forage | SEQ ID NO: 2 | 6.941 | 0.326 | 6.941 to 416.486 | 0.326 to 19.576 |
| Oat Forage | SEQ ID NO: 1 | 14.044 | 0.660 | 14.044 to 842.657 | 0.660 to 39.602 |
| Soybean Forage | SEQ ID NO: 1 | 20.501 | 1.001 | 20.501 to 1230.086 | 1.001 to 60.045 |
| Wheat Forage | SEQ ID NO: 1 | 13.721 | 0.640 | 13.721 to 823.286 | 0.640 to 38.378 |

The intra- and inter-assay precision and accuracy of the method are summarized in Table 27.

TABLE 27

Intra- and Inter-Assay Precision and Accuracy Range for HPPD in Commodity Crops

| Plant species/ Matrix | Intra-Assay | | Inter-Assay | |
|---|---|---|---|---|
| | Precision (% CV) | Accuracy (% bias) | Precision (% CV) | Accuracy (% bias) |
| Barley Seed | 0.8 to 5.5 | −8.4 to 1.5 | 2.3 to 5.0 | −6.2 to −3.2 |
| Maize Seed | 0.5 to 6.7 | −19.5 to −0.3 | 4.9 to 8.6 | −9.9 to −3.8 |
| Rice Seed | 0.2 to 2.8 | −6.3 to −0.4 | 1.3 to 2.4 | −5.7 to −1.7 |
| Soybean Seed | 0.5 to 4.8 | −8.9 to −2.9 | 2.5 to 3.4 | −6.4 to −5.1 |
| Wheat Seed | 0.8 to 3.7 | −10.1 to −1.5 | 1.5 to 4.4 | −7.6 to −6.5 |
| Barley Forage | 0.5 to 5.8 | −18.9 to −4.0 | 2.8 to 5.4 | −16.6 to −5.3 |
| Maize Forage | 0.9 to 4.9 | −15.6 to −2.1 | 5.3 to 7.0 | −10.5 to −5.2 |
| Oat Forage | 0.4 to 8.6 | −10.7 to 0.9 | 1.5 to 5.5 | −7.6 to −2.8 |
| Soybean Forage | 0.6 to 5.1 | −11.6 to −2.3 | 1.6 to 4.9 | −6.5 to −5.6 |
| Wheat Forage | 0.9 to 6.2 | −10.1 to −0.7 | 2.8 to 6.0 | −8.2 to −4.6 |

A linear equation was determined to adequately represent the concentration/detector response relationship for HPPD in all commodity crops. A data weighting of 1/x was used for all commodity crops.

The efficiency of the protein extraction method was 59.9% for barley seed, 69.8% for maize seed, 73.9% for rice seed, 64.9% for soybean seed, 54.3% for wheat seed, 69.8% for barley forage, 76.3% for maize forage, 78.4% for oat forage, 65.4% for soybean forage and 77.2% for wheat forage. The CV of the first round of extraction was below 20.0% for all commodity crops except for wheat seed which was 27.5% CV. However the Precision and Accuracy results of QC0 (endogenous) for wheat seed coming from a single extraction demonstrate that a precision ≤20.0% was achieved.

The processed stability (dry extract) was evaluated for 6 days at −20° C. The stability assessment met acceptance criteria. The CV was ≤25.0% and the % difference of peak area ratios between stability and Day 0 QCs were within ±25.0% for all commodity crops.

All performance parameters evaluated met the defined acceptance criteria except for the % of the final extraction of barley and wheat seed which was 8.2 and 6.2% respectively as well as the precision of the first round of extraction for wheat seed which was at 27.5% CV. Since the concentration of HPPD in samples analysis will be determined from a single extraction (first round) and adjusted for % extraction efficiency and a precision of ≤20.0% was achieved for wheat seed in the precision and accuracy runs there is no impact on the outcome of the study. Based on the results of this study, the mass spectrometry-based method has been confirmed to be suitable for quantification of HPPD protein for the list of commodity crops evaluated in this study in accordance with GLPS.

While the invention has been described in connection with specific embodiments thereof, it will be understood that the inventive device is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

All publications and patent applications mentioned in this specification are indicative of the level of skill of those skilled in the art that this invention pertains. All publications and patent applications are herein incorporated by reference to the same extent as if each individual publication or patent application was specifically and individually indicated to be incorporated by reference.

What is claimed is:

1. A labeled surrogate peptide for use in a mass spectrometry assay to selectively detect or quantitate a p-hydroxyphenylpyruvate dioxygenase (HPPD) protein in a mixture of proteins in one or more biological samples from one or more crop plants, the labeled surrogate peptide comprising an isotope label and an amino acid sequence consisting of GNFSELFK (SEQ ID NO: 1) or GNFSQLFK (SEQ ID NO:2).

2. The labeled surrogate peptide of claim 1, wherein the labeled surrogate peptide is labeled by incorporation of a stable isotope labeled (SIL) amino acid.

3. The labeled surrogate peptide of claim 2, wherein the SIL amino acid is lysine.

4. The labeled surrogate peptide of claim 1, wherein said one or more crop plants comprises barley, rice, soybean, wheat, oat or maize.

5. The surrogate peptide of claim 4, wherein said one or more crop plants comprises barley, soybean, wheat or rice and the surrogate peptide comprises a label and the amino acid sequence of SEQ ID NO:1.

6. The surrogate peptide of claim 4, wherein said one or more crop plants comprises maize and the surrogate peptide comprises a label and the amino acid sequence of SEQ ID NO:2.

7. An assay cassette comprising at least two labeled surrogate peptides comprising amino acid sequences consisting of GNFSELFK (SEQ ID NO:1) and GNFSQLFK (SEQ ID NO:2).

8. A method of simultaneously detecting or quantitating multiple target p-hydroxyphenylpyruvate dioxygenase (HPPD) proteins in a complex biological sample from a crop plant comprising multiple target HPPD proteins and multiple non-target proteins, the method comprising:
   a) obtaining a biological sample from a crop plant;
   b) extracting proteins from the biological sample, resulting in an extract comprising a mixture of proteins;
   c) reducing an amount of insoluble proteins in the extract of step b), resulting in an extract of concentrated soluble proteins;
   d) digesting the soluble proteins in the extract of step c), resulting in an extract comprising peptide fragments, wherein the peptide fragments include an unlabeled surrogate peptide specific for each target HPPD protein of the multiple target HPPD proteins;
   e) concentrating the peptide fragments in the extract of step d),
   f) adding one or more synthetic labeled surrogate peptides comprising a label and an amino acid sequence of SEQ ID NO: 1 or 2 to the extract of step e) to create a peptide fragment mixture, wherein each of the one or more synthetic labeled surrogate peptides in the peptide fragment mixture is an analog of the unlabeled surrogate peptide specific for a target HPPD protein and has the same amino acid sequence as the unlabeled surrogate peptide specific for the target HPPD protein, and wherein a different synthetic labeled surrogate peptide is added for each of the multiple target HPPD proteins;
   g) concentrating the unlabeled surrogate peptides and the synthetic labeled surrogate peptides by reducing an amount of non-surrogate peptides in the peptide fragment mixture;
   h) resolving the peptide fragment mixture from step g) via liquid chromatography;
   i) analyzing the peptide fragment mixture resulting from step h) via mass spectrometry, wherein detection of a transition ion fragment of an unlabeled surrogate peptide and a transition ion fragment of the analogous synthetic labeled surrogate peptide is indicative of presence of the target HPPD protein that the unlabeled surrogate peptide is specific for; and optionally,
   j) calculating an amount of the target HPPD protein in the biological sample by comparing mass spectrometry signals generated from the transition ion fragment of the unlabeled surrogate peptide with mass spectrometry signals generated by the transition ion fragment of the analogous synthetic labeled surrogate peptide of the target HPPD protein.

9. The method of claim 8, wherein said crop plant is barley, soybean, wheat or rice and the one or more synthetic labeled surrogate peptides comprises a label and the amino acid sequence of SEQ ID NO:1.

10. The method of claim 8, wherein said crop plant is maize and the one or more synthetic labeled surrogate peptides comprises a label and the amino acid sequence of SEQ ID NO:2.

11. The method of claim 9, wherein the one or more synthetic labeled surrogate peptides is labeled by incorporation of a stable isotope labeled (SIL) amino acid.

12. The method of claim 11, wherein the SIL amino acid is lysine.

\* \* \* \* \*